(12) United States Patent
Altman

(10) Patent No.: US 7,852,318 B2
(45) Date of Patent: Dec. 14, 2010

(54) ACOUSTIC ROBUST SYNCHRONIZATION SIGNALING FOR ACOUSTIC POSITIONING SYSTEM

(75) Inventor: Nathan Altman, RaAnana (IL)

(73) Assignee: EPOS Development Ltd., Hod-HaSharon (IL)

( * ) Notice: Subject to any disclaimer, the term of this patent is extended or adjusted under 35 U.S.C. 154(b) by 1002 days.

(21) Appl. No.: 11/596,625

(22) PCT Filed: May 17, 2005

(86) PCT No.: PCT/IL2005/000509

§ 371 (c)(1),
(2), (4) Date: Nov. 15, 2006

(87) PCT Pub. No.: WO2005/111653

PCT Pub. Date: Nov. 24, 2005

(65) Prior Publication Data

US 2008/0084789 A1    Apr. 10, 2008

Related U.S. Application Data

(60) Provisional application No. 60/571,497, filed on May 17, 2004.

(51) Int. Cl.
*G06F 3/033* (2006.01)
(52) U.S. Cl. ................................. 345/158; 178/19.02
(58) Field of Classification Search ......... 345/156–183; 178/19.02, 19.05, 19.07
See application file for complete search history.

(56) References Cited

U.S. PATENT DOCUMENTS

| 4,183,011 A | 1/1980 | Massa |
| 4,211,489 A | 7/1980 | Kleinknecht et al. |
| 4,271,490 A | 6/1981 | Minohara et al. |
| 4,297,607 A | 10/1981 | Lynnworth et al. |
| 4,433,399 A | 2/1984 | Massa |
| 4,501,186 A | 2/1985 | Ikuma |
| 4,554,834 A | 11/1985 | Prinz et al. |
| 4,576,047 A | 3/1986 | Lauer et al. |
| 4,577,506 A | 3/1986 | Poole et al. |
| 4,630,072 A | 12/1986 | Scardovi et al. |
| 4,641,291 A | 2/1987 | Simmons, Sr. et al. |
| 4,672,592 A | 6/1987 | Skinner |
| 4,814,552 A | 3/1989 | Stefik et al. |

(Continued)

FOREIGN PATENT DOCUMENTS

CN    26122094    4/2004

(Continued)

OTHER PUBLICATIONS

Partial International Search Report Dated Sep. 18, 2008 From the International Searching Authority Re.: Application No. PCT/IB2008/050946.

(Continued)

*Primary Examiner*—Chanh Nguyen
*Assistant Examiner*—Adakou Foli

(57) ABSTRACT

A position detection system comprising positional element and positioning device, wherein the positional element transmits a continuously modulated acoustic waveform and a synchronization signal that is a sequence of at least two synchronization packets, each bearing timing data for the continuously modulated acoustic waveform. Additionally, the synchronization signal uses time hopping to support concurrent positioning of a plurality of positional elements.

64 Claims, 8 Drawing Sheets

U.S. PATENT DOCUMENTS

| | | | |
|---|---|---|---|
| 4,991,148 A | 2/1991 | Gilchrist | |
| 5,062,089 A | 10/1991 | Willard et al. | |
| 5,138,159 A | 8/1992 | Takase et al. | |
| 5,142,506 A | 8/1992 | Edwards | |
| 5,245,863 A | 9/1993 | Kajimura et al. | |
| 5,339,259 A | 8/1994 | Puma et al. | |
| 5,372,138 A | 12/1994 | Crawley et al. | |
| 5,391,197 A | 2/1995 | Burdette et al. | |
| 5,394,741 A | 3/1995 | Kajimura et al. | |
| 5,421,338 A | 6/1995 | Crowley et al. | |
| 5,432,346 A | 7/1995 | Nose et al. | |
| 5,511,043 A | 4/1996 | Lindberg | |
| 5,515,853 A | 5/1996 | Smith et al. | |
| 5,517,579 A | 5/1996 | Baron et al. | |
| 5,519,686 A | 5/1996 | Yanagisawa et al. | |
| 5,524,630 A | 6/1996 | Crowley | |
| 5,530,683 A | 6/1996 | Lindberg | |
| 5,550,791 A | 8/1996 | Peloquin et al. | |
| 5,557,301 A * | 9/1996 | D'Aviau de Piolant | 345/179 |
| 5,588,432 A | 12/1996 | Crowley | |
| 5,682,445 A | 10/1997 | Smith | |
| 5,702,629 A | 12/1997 | Cui et al. | |
| 5,715,825 A | 2/1998 | Crowley | |
| 5,721,721 A | 2/1998 | Yanagisava et al. | |
| 5,750,941 A * | 5/1998 | Ishikawa et al. | 178/19.02 |
| 5,840,031 A | 11/1998 | Crowley et al. | |
| 5,866,856 A | 2/1999 | Holtzman | |
| 5,867,146 A | 2/1999 | Kim et al. | |
| 5,977,958 A | 11/1999 | Baron et al. | |
| 6,004,269 A | 12/1999 | Crowley et al. | |
| 6,111,565 A | 8/2000 | Chery et al. | |
| 6,137,621 A | 10/2000 | Wu | |
| 6,147,681 A | 11/2000 | Chery et al. | |
| 6,151,014 A | 11/2000 | Zloter et al. | |
| 6,169,281 B1 | 1/2001 | Chen et al. | |
| 6,211,863 B1 | 4/2001 | Chery et al. | |
| 6,232,962 B1 | 5/2001 | Davis et al. | |
| 6,252,656 B1 | 6/2001 | Wu et al. | |
| 6,265,676 B1 | 7/2001 | Zloter et al. | |
| 6,282,340 B1 | 8/2001 | Nasu et al. | |
| 6,292,177 B1 | 9/2001 | Zloter et al. | |
| 6,292,180 B1 | 9/2001 | Lee | |
| 6,300,580 B1 | 10/2001 | Shenholtz et al. | |
| 6,367,335 B1 | 4/2002 | Hicks | |
| 6,392,330 B1 | 5/2002 | Zloter et al. | |
| 6,424,340 B1 | 7/2002 | Holtzman et al. | |
| 6,430,342 B1 | 8/2002 | Kim et al. | |
| 6,485,413 B1 | 11/2002 | Boppart et al. | |
| 6,504,289 B2 | 1/2003 | Toda et al. | |
| 6,577,299 B1 | 6/2003 | Schiller et al. | |
| 6,681,635 B1 | 1/2004 | Van Schaik | |
| 6,724,371 B1 | 4/2004 | Shenholtz et al. | |
| 6,738,408 B2 | 5/2004 | Abedin | |
| 6,745,632 B1 | 6/2004 | Dryer et al. | |
| 6,771,006 B2 | 8/2004 | Zloter et al. | |
| 6,778,735 B2 | 8/2004 | Miller et al. | |
| 6,798,403 B2 | 9/2004 | Kitada et al. | |
| 6,816,266 B2 | 11/2004 | Varshneya et al. | |
| 6,822,641 B2 | 11/2004 | Shenholtz et al. | |
| 6,823,105 B2 | 11/2004 | Zloter et al. | |
| 6,831,781 B2 | 12/2004 | Tearney et al. | |
| 6,841,742 B2 | 1/2005 | Shenholtz et al. | |
| 6,873,415 B2 | 3/2005 | Amonette et al. | |
| 7,113,173 B1 | 9/2006 | Bi et al. | |
| 7,336,262 B2 * | 2/2008 | Tsuji | 345/173 |
| 2002/0031243 A1 | 3/2002 | Schiller et al. | |
| 2002/0176577 A1 | 11/2002 | Xu | |
| 2003/0095708 A1 | 5/2003 | Pittel | |
| 2003/0142065 A1 | 7/2003 | Pahlavan | |
| 2003/0151596 A1 | 8/2003 | Moyne et al. | |
| 2004/0032399 A1 * | 2/2004 | Sekiguchi et al. | 345/173 |
| 2005/0077102 A1 | 4/2005 | Banter et al. | |
| 2005/0150697 A1 | 7/2005 | Altman et al. | |
| 2006/0084157 A1 | 4/2006 | Happe | |
| 2008/0166048 A1 | 7/2008 | Raif et al. | |

FOREIGN PATENT DOCUMENTS

| | | |
|---|---|---|
| DE | 19701344 | 7/1997 |
| EP | 0312481 | 4/1989 |
| EP | 0666543 | 9/1995 |
| EP | 1450296 | 8/2004 |
| EP | 1504330 | 8/2006 |
| GB | 2043899 | 8/1980 |
| GB | 2121174 | 12/1983 |
| JP | 53-117466 | 10/1978 |
| JP | 01-046672 | 2/1989 |
| JP | 08-321670 | 12/1996 |
| JP | 09-305306 | 11/1997 |
| JP | 11-237950 | 8/1999 |
| JP | 2001-42888 | 2/2001 |
| JP | 2001-518309 | 10/2001 |
| JP | 2002-91472 | 3/2002 |
| KR | 1997-60988 | 8/1997 |
| KR | 1020040006769 | 1/2004 |
| KR | 1020040009625 | 1/2004 |
| TW | 394833 | 6/2000 |
| TW | 235010 | 6/2005 |
| WO | WO 97/33145 | 9/1997 |
| WO | WO 00/13039 | 3/2000 |
| WO | WO 00/21020 | 4/2000 |
| WO | WO 00/21203 | 4/2000 |
| WO | WO 01/35329 | 5/2001 |
| WO | WO 02/01466 | 3/2002 |
| WO | WO 03/069547 | 8/2003 |
| WO | WO 03/088136 | 10/2003 |
| WO | WO 2004/010592 | 1/2004 |
| WO | WO 2006/100682 | 9/2006 |
| WO | WO 2007/004119 | 1/2007 |
| WO | WO 2008/111011 | 9/2008 |

OTHER PUBLICATIONS

Cai et al. "A Study on Packaging of PZT MEMS Microphone", 2005 Electronics Components and Technology Conference, Lake Buena Vista, FL, USA, XP002488699, p. 1077-1080, Jun. 3, 2005. Retrieved From the Internet: URL:http://ieeexplore.ieee.org/ie15/9844/31024/01441405.pdf>.

Junge et al. "Simulation of Capacitive Micromachined Ultrasonic Transducers (cMUT) for Low Frequencies and Silicon Condenser Microphones Using An Analytical Model", Proceedings of the IEEE Ultrasonic Symposium, Honolulu, Hawaii, Oct. 5 2005, XP010701172, 1: 485-488, Oct. 5, 2005. p. 487.

Neumann Jr. et al. "CMOS-MEMS Membrane for Audio-Frequency Acoustic Actuation", Sensors and Actuators A, XP004377889, 95(2-3): 175-182, Jan. 1, 2002. p. 175, 182.

Official Action Dated Jul. 10, 2008 From the United States Patent and Trademark Office Re:. U.S. Appl. No. 10/510,228.

Translation of the Office Action Dated Oct. 31, 2008 From the State Intellectual Property Office of the People's Republic of China Re.: Application No. 200580023798.0.

Translation of the Office Action Dated Sep. 27, 2005 From the Patent Office of Taiwan Re.: Application No. 92128407.

Office Action Dated Jun. 2, 2006 From the Patent Office of the People's Republic of China Re.: Application No. 03813673.2.

Response Dated Apr. 22, 2010 to Communication Pursuant to Article 94(3) EPC of Jan. 8, 2010 From the European Patent Office Re.: Application No. 08719694.5.

Second Written Opinion Dated Dec. 27, 2004 From the International Preliminary Examining Authority Re.: Application No. PCT/IL03/00309.

Communication Relating to the Results of the Partial International Search Dated Sep. 18, 2008 From the International Searching Authority Re.: Application No. PCT/IB2008/050946.

Examination Report Dated Oct. 12, 2005 From the Intellectual Property Office of New Zealand Re.: Application No. 535953.
Examination Report Dated Sep. 26, 2008 From the Government of India, Patent Office Re.: Application No. 2344/CHENP/2004.
Examiner's Report Dated Oct. 30, 2008 From the Australian Government, IP Australia Re.: Application No. 2005243022.
International Preliminary Report on Patentability Dated Mar. 14, 2007 From the International Preliminary Examining Authority Re.: Application No. PCT/IL2005/000509.
International Preliminary Report on Patentability Dated Aug. 27, 2007 From the International Preliminary Examining Authority Re.: Application No. PCT/IL2006/000373.
Office Action Dated Feb. 10, 2009 from the US Patent and Trademark Office Re.: U.S. Appl. No. 10/510,228.
Official Action Dated Jul. 10, 2008 From the US Patent and Trademark Office Re.: U.S. Appl. No. 10/510,228.
Translation of Official Letter Dated Dec. 17, 2004 From the National Bureau of Standards, Ministry of Economic Affairs of Taiwan Re.: Application No. 92128407.
Communication Pursuant to Article 94(3) EPC Dated Mar. 6, 2009 From the European Patent Office Re.: Application No. 06728180.8.
International Search Report and the Written Opinion Dated Dec. 16, 2008 From the International Searching Authority Re.: Application No. PCT/IB2008/050946.
Notice of the Reason for Rejection Dated May 1, 2009 From the Korean Intellectual Property Office Re.: Applicaiton No. 2004-7016511 and Its Translation Into English.
Official Action Dated Feb. 10, 2009 From the US Patent and Trademark Office Re.: U.S. Appl. No. 10/510,228.
Official Decision of Rejection Dated Dec. 19, 2008 From the Japanese Patent Office Re.: Application No. 2003-584999 and Its Translation Into English.
Translation of Office Action Dated Jan. 9, 2009 From the State Intellectual Property Office of the People' Republic of China Re.: Application No. 200680017983.3.
Translation of Office Action Dated Feb. 13, 2009 From the State Intellectual Property Office of the People's Republic of China Re.: Application No. 200580023798.0.
Translation of Office Action Dated Oct. 31, 2008 From the Patent Office of the People's Republic of China Re.: Application No. 200580023798.0.
Peters et al. "X-Ray Crystal Structure of the Fe-Only Hydrogenase (Cpl) from Clostridium Pasteurianum to 1.8 Angstrom Resolution", Science, 282: 1853-1858, 1998.
Nicolet et al. "Desulfovibrio Desulfuricans Iron Hydrogenase: The Structure Shows Unusual Coordination to an Active Site Fe Binuclear Center", Structure, 7: 13-.23, 1999.
Translation of Official Query Dated Apr. 20, 2010 From the Japanese Patent Office Re.: Application No. 2003-584999.
Attisano et al. "Signal Transduction by the TGF-β Superfamily", Science, 296(5573): 1646-1647, 2002.
Nonaka et al. "Ultrasonic Position Measurement and Its Applications to Human Interface", Instrumentation and Measurement Technology Conference, IMTC/94, Conference Proceedings, 10th Anniversary, Advanced Technologies in I & M, IEEE Hamatsu, Japan, IEEE New York, USA, p. 753-756, 1994.
Communication Pursuant to Article 94(3) EPC Dated Sep. 10, 2009 From the European Patent Office Re.: Application No. 06728180.8.
International Preliminary Report on Patentability Dated Sep. 24, 2009 From the International Bureau of WIPO Re.: Application No. PCT/IB2008/050946.
Translation of Notice of Final Rejection Dated Dec. 9, 2009 From the Korean Intellectual Property Office Re.: Application No. 2004-7016511.
Examination Report Dated Sep. 6, 2006 From the Intellectual Property Office of New Zealand Re.: Application No. 535953.

Examination Report Dated Jul. 7, 2009 From the Intellectual Property Office of New Zealand Re.: Application No. 562665.
Examination Report Dated Jul. 29, 2009 From the Government of India, Patent Office Re.: Application No. 2344/CHENP/2004.
Examiner's Report Dated Dec. 14, 2007 From the Australian Government, IP Australia Re.: Application No. 2003219506.
First Written Opinion Dated Oct. 29, 2004 From the International Preliminary Examining Authority Re.: Application No. PCT/IL03/00309.
International Preliminary Examination Report Dated Apr. 26, 2005 From the International Preliminary Examining Authority Re.: Application No. PCT/IL03/00309.
International Search Report Dated Aug. 2, 2006 From the International Searching Authority Re.: Application No. PCT/IL2005/000509.
International Search Report Dated Dec. 16, 2008 From the International Searching Authority Re.: Application No. PCT/IB2008/050946.
International Search Report Dated Apr. 18, 2007 From the International Searching Authority Re.: Application No. PCT/IL2006/000373.
International Search Report Dated Sep. 22, 2004 From the International Searching Authority Re. Application No. PCT/IL03/00309.
Official Action Dated Jul. 14, 2009 From the US Patent and Trademark Office Re.: U.S. Appl. No. 10/510,228.
Office Action Dated Mar. 19, 2008 From the US Patent and Trademark Office Re.: U.S. Appl. No. 10/510,228.
Official Action Dated Nov. 26, 2007 From the US Patent and Trademark Office Re.: U.S. Appl. No. 10/510,228.
Translation of Notice of Reason for Rejection Dated May 2, 2008 From the Japanese Patent Office Re.: Application No. 2003-584999.
Translation of Office Action Dated Jul. 17, 2009 From the State Intellectual Property Office of the People's Republic of China Re.: Application No. 200680017983.3.
Translation of the Official Letter Dated Dec. 17, 2004 From the National Bureau of Standards, Ministry of Economic Affairs of Taiwan Re.: 92128407.
Written Opinion Dated Aug. 2, 2006 From the International Searching Authority Re.: Application No. PCT/IL2005/000509.
Written Opinion Dated Apr. 12, 2007 From the International Searching Authority Re.: Application No. PCT/IL2006/000373.
Written Opinion Dated Dec. 16, 2008 From the International Searching Authority Re.: Application No. PCT/IB2008/050946.
Communication Pursuant to Article 94(3) EPC Dated Jan. 8, 2010 From the European Patent Office Re.: Application No. 08719694.5.
Official Action Dated Jan. 15, 2010 From the US Patent and Trademark Office Re.: U.S. Appl. No. 10/510,228.
Response Dated Jan. 17, 2010 to Communication Pursuant to Article 94(3) EPC of Sep. 10, 2009 From the European Patent Office Re.: Application No. 06728180.8.
Response Dated Feb. 18, 2010 to Notice of Final Rejection of Dec. 9, 2009 From the Korean Intellectual Property Office Re.: Application No. 2004-7016511.
Response Dated Dec. 29, 2009 to Examination Report of Jul. 7, 2009 From the Intellectual Property Office of New Zealand Re.: Application No. 562665.
Response Dated Jun. 29, 2010 to Official Query of Apr. 20, 2010 From the Japanese Patent Office Re.: Application No. 2003-584999.
Communication Pursuant to Article 94(3) EPC Dated Jul. 14, 2010 From the European Patent Office Re. Application No. 06728180.8.
Translation of Office Action Dated Jun. 9, 2010 From the State Intellectual Property Office of the People's Republic of China Re.: Application No. 200680017983.3.
Response Dated Jun. 2, 2010 to Official Action of Jan. 15, 2010 From the US Patent and Trademark Office Re.: U.S. Appl. No. 10/510,228.

* cited by examiner

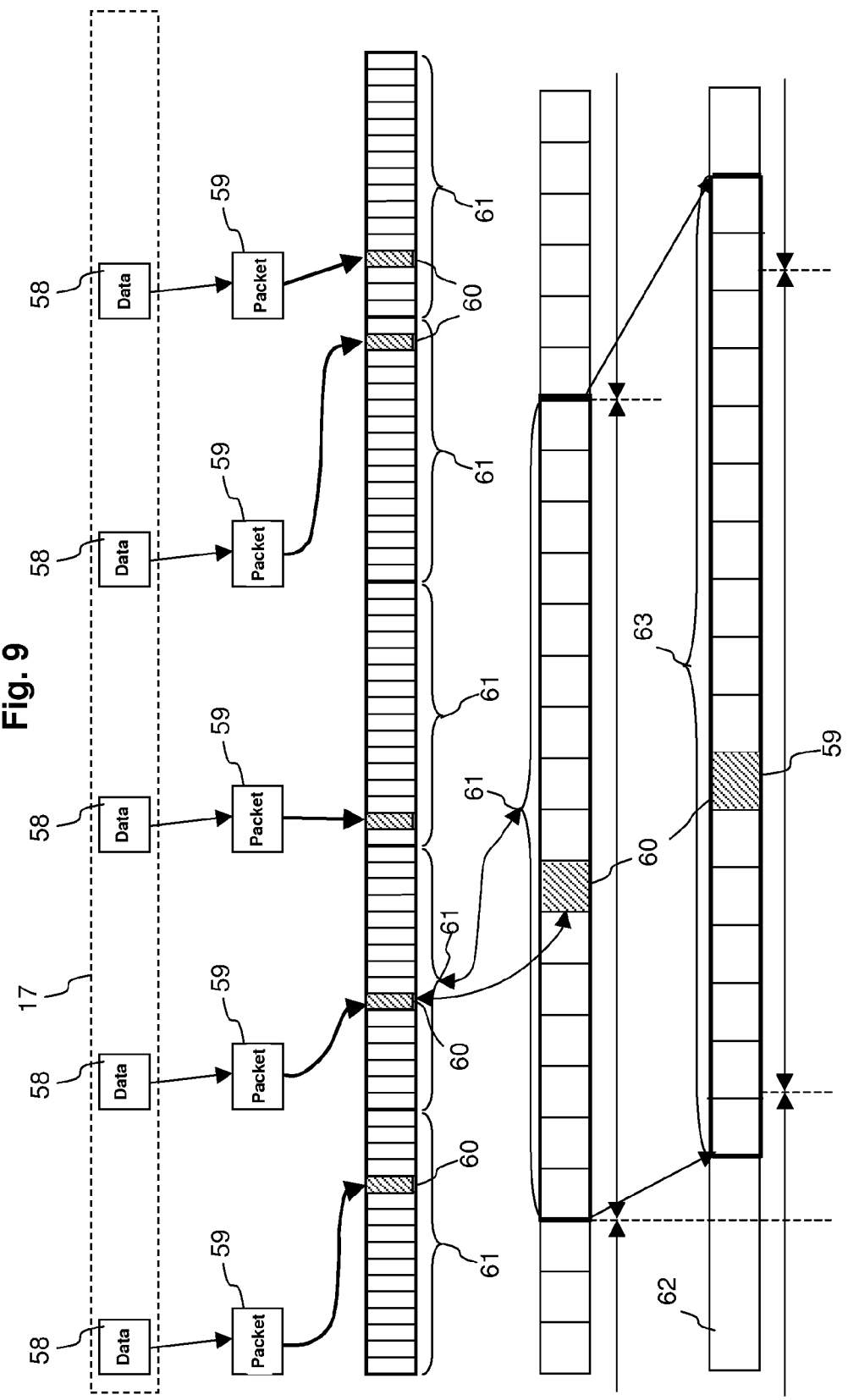

ACOUSTIC ROBUST SYNCHRONIZATION SIGNALING FOR ACOUSTIC POSITIONING SYSTEM

RELATED APPLICATIONS

This Application is a National Phase of PCT Patent Application No. PCT/IL2005/000509 having International Filing Date of May 17, 2005, which claims the benefit of U.S. Provisional Patent Application No. 60/571,497 filed on May 17, 2004. The contents of the above Applications are all incorporated herein by reference.

FIELD AND BACKGROUND OF THE INVENTION

The present invention relates to an acoustic positioning method and system and, more particularly, but not exclusively to a method and system for synchronization of transmissions between a positional element and a positioning device.

The application of positioning, or location awareness, is commonly divided according to the size of the space in which the positional element should be located.

The space size ranges from the personal area, which range is typically up to 1 meter, the room area which range is typically up to 10 meters, the local area, such as a warehouse, which range is up to 100 meters, and wide area which is typically an open space.

Some applications require positioning in three dimensions. Other applications, typically when the object is known to be located close enough to a known surface, such as the floor, require positioning in two dimensions only, and some applications require only the measurement of the distance between the positional element and the positioning device.

There are several methods for locating elements and most of them are based on measuring the time of arrival of a signal transmitted or reflected from the positional element.

There are numerous applications for small space positioning, that is, positioning within personal, room and local areas. The main applications involve pointing devices for computer interaction, and robotics and machine control, locating portable home appliances and especially toys, locating inventory in warehouses, hospital wards, etc.

1. Personal Area Positioning—Computer pointing devices, digital pens and touch screens 3-D Mouse:

A 3D mouse uses electromagnetic or ultrasonic positioning techniques to indicate its position in 3-D space to a monitoring device. The cordless mice in use today use Bluetooth and similar radio and IR transmitters for wireless connectivity. The radio or IR only takes care of the wireless connectivity, that is the signaling issue. Positioning generally involves a movement tracker in the mouse itself, which may be optically based. Simple movement tracking gives a 2D solution. 3D solutions can be produced, for example using either of the following:

Acoustic:

A mouse emits ultrasonic and IR pulses that are received by a desktop receiver. By measuring the time of flight, triangulation can be performed.

IR Sensors:

A mouse emits IR pulses whose angles are measured by a desktop receiver. Several angle sensors allow three-dimensional triangulation thus obtaining the special position.

PC Tablets and Styluses:

A PC tablet uses a digital pen or stylus. The stylus enables interactions including writing directly on a graphic tablet, PC tablet, PC screen, PDA screen, cellphone screen and on any other computer enabled surface, screen or tablet. Available solutions work with passive or active electromagnetic or acoustic technologies.

Digital Pens

Digital pens are pointing devices used for electronic detection of handwriting or hand drawing, or for general pointing. The digital pens generally use technologies such as acoustics, IR and light. Other versions use accelerometers that sense accelerations and transmit the data to a positioning assembly. Another version is a camera that analyzes small printing codes on special paper to determine its position. Other pens use electromagnetic (including passive & active), and other technologies for their operation. Some of the digital pens are an autonomous unit, meaning the pen works independently, providing its own fully processed co-ordinates as an output, and such is typical of optical and digital camera based units. Others, especially acoustic and electromagnetic devices, require a receiving or sensing unit. Digital Pens are widely used with PC's, laptops, PDAs, cellular telephones, electronic books, and the like.

Touch Screens:

Touch screens generally comprise sensors embedded within or near a computer screen in order to receive input from the screen. Some technologies include coating the screen with special material that can sense physical contact, the material featuring electrical resistance, electrical capacitance or a surface acoustic wave (SAW) material. Other technologies include embedding of sensors around the screen. The sensors may be IR, acoustic, SAW and others.

2. Room Area Positioning—Interactive Whiteboards and Toys

Interactive Whiteboards

The interactive whiteboard is a whiteboard that captures written data from the board into an associated computer. One of the common technologies in this field is acoustic positioning: a marker is placed in a sleeve that transmits beacon signals which are picked up and analyzed by a dedicated device also placed near the whiteboard. In some cases an IR or electromagnetic signal is transmitted along with the acoustic beacon for better accuracy and for simplicity. Another common technology is electromagnetic: the above mentioned marker sleeve transmits an electromagnetic field, which is picked up by special loops on the back of the whiteboard.

Technology using electrical resistance is also used. In such a case the surface of the whiteboard is coated with resistive material. Pressure is applied to the coating, and the pressure causes a local change in the resistive properties of the board. From the changes, the controller is able to obtain a x, y position from the applied pressure.

Technology using electrical capacitance, which is similar to the resistive, can also be used. Again, pressure is used, this time to change the capacitance properties of the board. Then, the controller is able to obtain the x, y position Toys It is relatively uncommon, due to the high cost, to have toys in which one unit can be aware of the location of a second unit.

In a very basic example, one toy notes that there is another toy nearby, prompting a reaction, for example talking. In a more sophisticated example, one toy knows more or less where the other toy is.

In the future it is hoped to provide a yet more sophisticated example in which one unit can successfully pass an object to the next one and vice versa. Further in the future a toy is envisaged, in which twenty-two soccer robots run around passing the ball one to another. The robots calculate where to kick according to the locations of the other robots on the same and opposite teams. To provide each of the twenty-two robots with the computing and control power in order to play a game of soccer produces a very expensive and complex solution.

Generally, toy technology has to be provided at low cost and current technology is relatively expensive. Specific technologies each have their drawbacks:

Infrared sensors—IR can be used to indicate presence in the vicinity of a second object. At a higher level it can show a general direction.

Accelerometers—the disadvantages of accelerometers are discussed above in the section on pointing devices.

Acoustic—Acoustic devices are relatively expensive. Only a single unit can be used in the same environment, energy use is relatively high, and the devices are difficult to miniaturize.

Local Area Positioning—Robotics and Machine Control

In recent years several new robotics products have reached the prototype stage and beyond. The robotics products include freely moving robots for different applications. The applications include lawn mowers, pool cleaners, spy and bomb disposal robots with cameras and remote control and many more. Such robots typically use their own sensing together with pre-programming to find their way around in their surrounding environment.

Possible new applications include an autonomous vacuum cleaner. One or more vacuum cleaners may roam automatically around the premises, vacuuming dirt and transferring the dirt to either fixed location units or roaming units. The unit that vacuums may autonomously locate the receiving unit to which it delivers the dirt and dock therewith in order to deliver the dirt.

Drawbacks

All the technologies mentioned above, except the acoustic, need sensors on the positioning plane: the electromagnetic solution needs antenna loops on the back of the board, the pen with the camera needs special digitized paper and the touchscreens need special coatings. The need for sensors adds both to the cost of the final product, and furthermore provides an unnatural restriction on use in that it does not allow the user to use arbitrary planes, such as a cluttered desk surface, as a working platform.

Some of the technologies are limited to two-dimensional locations. But even those that can manage a third dimension do not currently provide accurate information of the third dimension. For example a stylus based on electromagnetic detection can be detected when hovering above a screen, but it is not possible to tell accurately how high it is. The detector simply determines that it is present.

There are other drawbacks specific to certain of the technologies. For instance, IR positioning has difficulties working with direct sun. Existing acoustic solutions have serious limitations in acoustically noisy environments, in particular in the all-important industrial environment, where ultrasound noise is most common.

Solutions that use wireless protocols as Bluetooth may suffer from protocol collisions, and from interference with other wireless equipment, such as WLAN equipment.

All the technologies that are based on measuring the time of flight of a signal transmitted by the positional element and received by the positioning device require accurate synchronization between the transmitter and the receiver to compensate for their clocks inaccuracy and drift.

Acoustic positioning methods and devices are known in the art, including, but not limited to, the following US patents: U.S. Pat. Nos. 6,876,356; 6,875,933; 6,841,742; 6,822,641; 6,731,270; 6,724,371; 6,717,073; 6,654,008; 6,633,280; 6,628,270; 6,556,694; 6,539,363; 6,535,206; 6,529,189; 6,517,266; 6,501,461; 6,456,567; 6,456,280; 6,424,340; 6,414,673; 6,404,416; 6,373,003; 6,335,723; 6,326,565; 6,313,825; 6,310,615; 6,300,580; 6,292,180; 6,292,177; 6,266,051; 6,265,676; 6,229,526; 6,211,863; 6,195,446; 6,191,778; 6,177,927; 6,153,836; 6,147,681; 6,144,367; 6,124,847; 6,111,565; 6,108,271; 6,104,387; 6,100,877; 6,067,080; 5,977,958; 5,907,130; 5,883,338; 5,872,743; 5,866,856; 5,818,421; 5,798,755; 5,793,361; 5,768,616; 5,750,941; 5,717,168; 5,657,054; 5,657,053; 5,635,951; 5,581,269; 5,557,301; 5,548,092; 5,539,159; 5,525,764; 5,517,579; 5,515,051; 5,500,492; 5,478,976; 5,308,936; 5,144,594; 5,128,660; 5,111,005; 5,054,005; 5,007,085; 4,991,148; 4,965,635; 4,814,552.

The reader is also referred to applicants prior application No. IL03/00309 filed Apr. 14, 2003, the contents of which are hereby incorporated by reference.

All the problems discussed above are further enhanced in the multi user environment, where one or more positioning devices have to locate several positional elements, and even more so, when the positional elements may roam between positioning devices.

There is thus a widely recognized need for, and it would be highly advantageous to have an infrared communications system and method devoid of the above limitations.

SUMMARY OF THE INVENTION

According to one aspect of the present invention there is provided a position detection system for use in association with computing applications, the position detection system containing at least one positional element for attaining a position and a positioning device operative to determine a position of the positional element. The positional element contains at least one first emitter for emitting a substantially continuously modulated acoustic waveform decodable to fix the position, and a second emitter for emitting a synchronization signal. The positioning device contains an arrangement of at least one of a first detector operative to detect the continuously modulated acoustic waveform in a manner permitting fixing of the position and outputting the waveform for computation, in a manner retentive of the position fixing ability; and a second detector operative to detect the synchronization signal. The synchronization signal being a sequence of at least two synchronization sub-signals, each synchronization sub-signal bearing timing data for the continuously modulated acoustic waveform, thereby to improve accuracy of the fixing of the position.

According to another aspect of the present invention there is provided a position detection system wherein the acoustic waveform is an ultrasonic waveform.

According to yet another aspect of the present invention there is provided a position detection system wherein the synchronization signal is an electromagnetic signal.

According to still another aspect of the present invention there is provided a position detection system wherein the synchronization signal is an infrared signal.

Further according to another aspect of the present invention there is provided a position detection system wherein the synchronization signal is a radio signal.

Still further according to another aspect of the present invention there is provided a position detection system wherein the timing data contains a measure of time elapsed between an identifiable component of the acoustic waveform and time of transmission of the synchronization signal.

Even further according to another aspect of the present invention there is provided a position detection system wherein the positional element additionally contains a first clock and the positioning device additionally containing a second clock, and the synchronization signal contains a clock synchronization data useful to synchronize between the first clock and the second clock.

Additionally according to another aspect of the present invention there is provided a position detection system wherein the synchronization signal additionally contains identification data of the positional element.

Additionally according to yet another aspect of the present invention there is provided a position detection system wherein the synchronization signal is transmitted within at least one time slot, the one time slot being randomly selected from a fixed number of time slots provided within a time-frame, the time-frame having a fixed duration and being continuously repeated.

Additionally according to one still another aspect of the present invention there is provided a position detection system wherein the synchronization signal additionally contains identification data of the time-frame and identification data of the time slot within the time-frame bearing the synchronization signal.

According to another aspect of the present invention there is provided a position detection system wherein the time-frame identification data is a counter of the time-frames and the time slot identification data is a location numeral of the time slot within the time-frame bearing the synchronization signal.

According to yet another aspect of the present invention there is provided a position detection system wherein the time-frame duration is known to the positioning device and the clock synchronization data is derived by the positioning device by correlating the received time-frame duration and the known time-frame duration.

According to still another aspect of the present invention there is provided a position detection system wherein the clock synchronization data is derived by linearly interpolating a sequence of the received time-frame durations and the known time-frame duration.

Further according to another aspect of the present invention there is provided a position detection system wherein the clock synchronization data is derived by using a phase lock loop between a sequence of the received time-frame durations and the known time-frame duration.

Still further according to another aspect of the present invention there is provided a position detection system wherein the acoustic waveform is selected from a predefined set of acoustic waveforms wherein the synchronization signal additionally contains an identification data of the selected acoustic waveform.

Even further according to another aspect of the present invention there is provided a position detection system wherein the modulation is an amplitude modulation, a frequency modulation or a phase modulation.

Additionally according to yet another aspect of the present invention there is provided a position detection system wherein the synchronization signal contains an error correction code.

Additionally according to still another aspect of the present invention there is provided a position detection system wherein the error correction code contains at least one cyclic redundancy character.

According to another aspect of the present invention there is provided a position detection system wherein the synchronization signal additionally contains at least one identification data of a change of a status of at least one discrete input.

According to yet another aspect of the present invention there is provided a position detection system wherein the discrete input is a state of a switch.

According to still aspect of the present invention there is provided a position detection system wherein the synchronization signal additionally contains a measure of time elapsed between the change of status of the discrete input and the transmission of the synchronization signal.

Further according to another aspect of the present invention there is provided a position detection system wherein the measure of elapsed time contains a count of the synchronization signals transmitted between the change of status of the discrete input and the transmission of the synchronization signal.

Still further according to another aspect of the present invention there is provided a position detection system wherein the count of the synchronization signals is limited and when the limit is reached the count remains at the limit until a next occurrence of a change of status of a switch.

Even further according to another aspect of the present invention there is provided a position detection system wherein the synchronization signal additionally contains at least one measurement data of at least one of an analog input and a digital input.

Additionally according to another aspect of the present invention there is provided a position detection system wherein the first detector arrangement contains a single detector.

Additionally according to yet another aspect of the present invention there is provided a position detection system wherein the first detector arrangement contains at least two detectors and is operative to determine the position in two dimensions.

Additionally according to still another aspect of the present invention there is provided a position detection system wherein the first detector arrangement contains at least three detectors and is operative to determine the position in three dimensions.

According to another aspect of the present invention there is provided a position detection system wherein the positional element is associated with at least one of a computer pointing device and a writing device.

According to yet another aspect of the present invention there is provided a position detection system wherein the positional element is associated with at least one of a mobile device and a portable device.

According to still another aspect of the present invention there is provided a position detection system according to any of the preceding claims and wherein the positional element is a plurality of positional elements.

Further according to another aspect of the present invention there is provided a position detection method for measuring a position of a positional element by a positioning device, the method containing the steps of: providing a first clock at the positional element, emitting a substantially continuously modulated acoustic waveform at the position of the positional element, the waveform synchronized with the first clock and decodable to fix the position, emitting a synchronization signal at the position of the positional element, the synchronization signal being a sequence of at least two synchronization signals, each synchronization signal bearing a timing data for the continuously modulated acoustic waveform, the timing data synchronized with the first clock, providing a second clock at the positioning device, receiving the acoustic waveform by the positioning device, via an arrangement of at least one of a first detector operative to detect the continuously modulated acoustic waveform in a manner permitting fixing of the position and outputting the waveform for computation, in a manner retentive of the position fixing ability, receiving the synchronization signal by the positioning device, the synchronizing second clock with the first clock by the positioning device, and computing the position of the positional device using the timing data and acoustic waveform.

Still further according to another aspect of the present invention there is provided a position detection method wherein the step of emitting the synchronization signal contains the steps of: providing a time-frame, providing a fixed number of time slots within each the time-frame, randomly selecting one the time slot within each the time-frame, emitting the synchronization signal within at least one time slot.

Even further according to another aspect of the present invention there is provided a position detection method additionally containing the steps of: providing the time-frame duration to the positioning device in advance, and deriving the clock synchronization data by the positioning device by correlating the received time-frame duration and the known time-frame duration.

Additionally according to another aspect of the present invention there is provided a position detection method wherein the step of deriving the clock synchronization data is performed by linearly interpolating a sequence of the received time-frame durations and the known time-frame duration.

Additionally according to yet another aspect of the present invention there is provided a position detection method wherein the step of deriving clock synchronization data is performed by using a phase lock loop between a sequence of the received time-frame durations and the known time-frame duration.

Additionally according to still another aspect of the present invention there is provided a position detection method wherein the step of emitting the acoustic waveform additionally contains randomly selecting the acoustic waveform from a predefined set of acoustic waveforms; and wherein the step of emitting synchronization signal additionally contains emitting an identification data of the selected acoustic waveform.

According to another aspect of the present invention there is provided a position detection method wherein the step of emitting the synchronization signal additionally contains emitting at least one identification data of a change of a status of at least one discrete input.

According to yet another aspect of the present invention there is provided a position detection method wherein the step of emitting the synchronization signal additionally contains emitting a measure of time elapsed between the change of status of the discrete input and the transmission of the synchronization signal.

According to still another aspect of the present invention there is provided a position detection method wherein the step of emitting the synchronization signal additionally contains emitting at least one measurement data of at least one of an analog input and a digital input.

Further according to another aspect of the present invention there is provided a position detection method wherein the step of receiving the acoustic waveform at the first detector arrangement contains receiving the acoustic waveform at least three first detectors.

Still further according to another aspect of the present invention there is provided a position detection method wherein the step of receiving the acoustic waveform at the first detector arrangement contains receiving the acoustic waveform via at least two first detectors and wherein the step of computing the position of the positional device contains fixing the position in two dimensions.

Even further according to another aspect of the present invention there is provided a position detection method wherein the step of receiving the acoustic waveform at the first detector arrangement contains receiving the acoustic waveform via at least three first detectors and wherein the step of computing the position of the positional device contains fixing the position in three dimensions.

Additionally according to another aspect of the present invention there is provided a position detection method wherein the step of emitting a sequence of synchronization signals starts at a predefined delay after emitting the identifiable component of the acoustic waveform, wherein the predefined delay is known to the positioning device, and wherein the step of the synchronizing second clock with the first clock uses the predefined delay to synchronize the second clock and the first clock.

Unless otherwise defined, all technical and scientific terms used herein have the same meaning as commonly understood by one of ordinary skill in the art to which this invention belongs. The materials, methods, and examples provided herein are illustrative only and not intended to be limiting.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 9 is a simplified illustration of a timing diagram of the transmission of the synchronization signal by the positional element past and the reception the synchronization signal by the positioning assembly part.

DETAILED DESCRIPTION OF THE PREFERRED EMBODIMENTS

Figure 1:
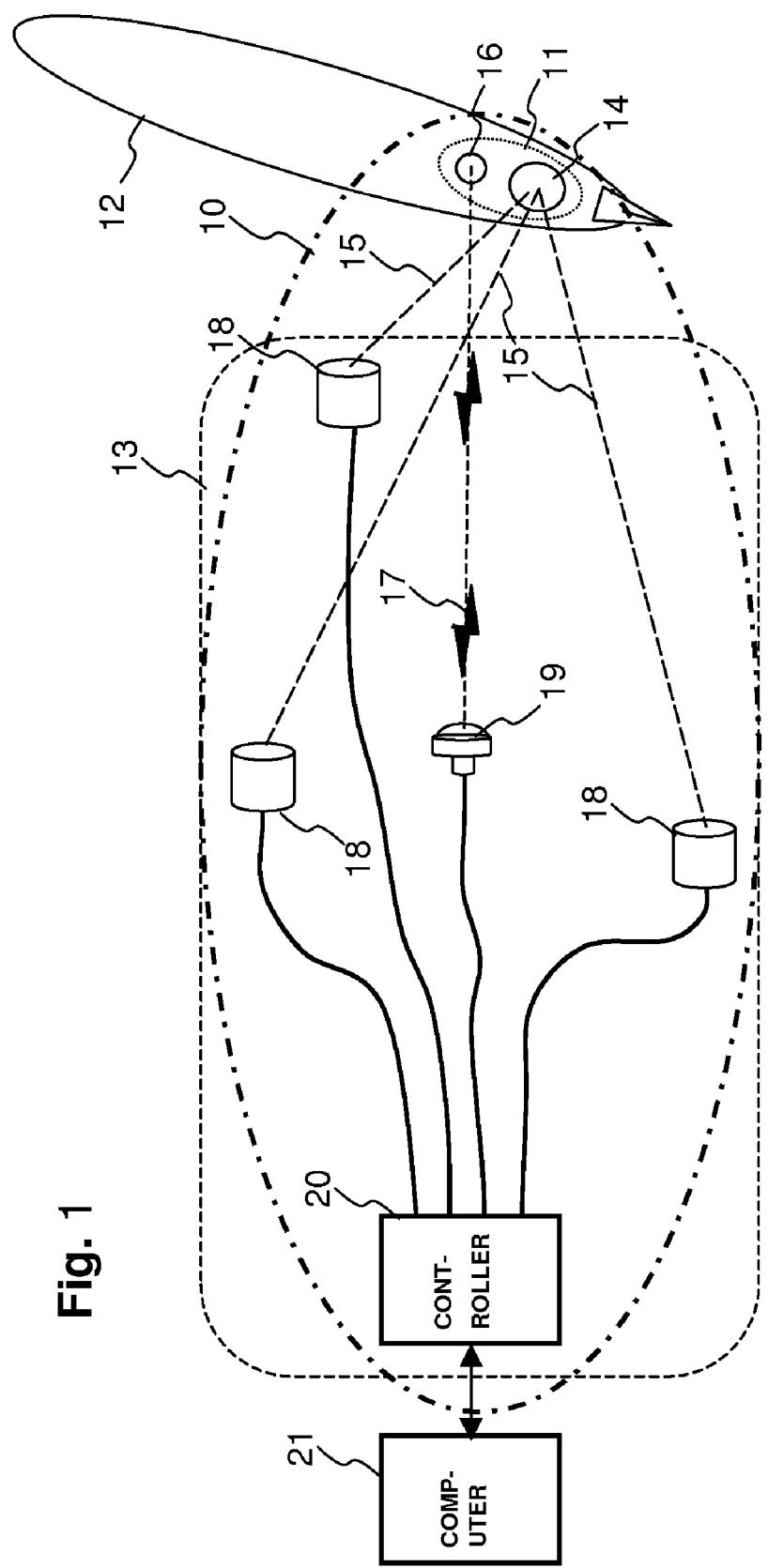
FIG. 1 is a simplified illustration of an acoustic positioning system according to a preferred embodiment of the present invention.

The principles and operation of a positioning system and method according to the present invention may be better understood with reference to the drawings and accompanying description.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Reference is now made to FIG. 1, which is a simplified illustration of a positioning system 10 according to a preferred embodiment of the present invention. Positioning system 10 comprises two main parts: a positional assembly 11 mounted on a positional device 12, which in the example of FIG. 1 is a pen, and a positioning assembly 13.

The positional assembly 11 comprises two emitters: an acoustic emitter 14, preferably operative to emit continuously modulated ultrasound signal 15, and a synchronization emitter 16 operative to emit a synchronization signal 17. The synchronization signal is preferably much faster than the acoustic signal, preferably the synchronization signal is an electromagnetic signal, preferably the synchronization signal is an infrared signal. Alternatively the synchronization signal is a radio signal.

The positioning assembly 13 comprises three acoustic signal receivers 18 and a synchronization signal receiver 19 connected to a positioning controller 20. The positioning controller may be a computing device such as a PC, a tablet, a PDA, etc., or an interfacing device to a computing device 21 as shown in FIG. 1. It is appreciated that the positioning assembly may comprise any number of acoustic receivers according to the positioning requirements. Typically, the positioning assembly comprises one acoustic receiver for one-dimensional positioning, or two receivers for two-dimensional positioning or three receivers for three-dimensional positioning. However, to obtain increased accuracy, increased coverage and to avoid obstruction of the signal path, the number of the acoustic receivers can be larger than the number of the positioning dimensions. Similarly, the number of synchronization receivers can be larger than one.

The continuously modulated ultrasound signal 15 and the synchronization signal 17 comprise the following features:

a. The continuously modulated ultrasound signal 15 comprises a preferably continuous and contiguous sequence of modulation frames.

b. Each modulation frame is distinguished by a time mark, typically but not exclusively the associated with the beginning of the frame. The time mark is typically a component of the modulation scheme of the acoustic signal.

c. The synchronization signal 17 comprises a sequence of preferably non-continuous data elements. The rate of data elements is higher than the rate of modulation frames. Thus, a plurality of data elements are transmitted between each consecutive time marks.

d. Each data element comprises information locating the time of transmission of the time mark according to a clock of the positional element 11. All the data elements following each time mark bears timing information for the same preceding time mark. Thus, assuring the reception of at least one correct timing information for each modulation frame at the positioning assembly 13. The timing information is typically, but not exclusively, the elapsed time between the transmission of the time mark and the transmission of each following data element.

e. The positioning assembly 13 calculates the position of the positional element 11 by measuring the elapsed time between the time of transmission of the time mark as provided by the following data element and the time of arrival of the time mark at each of the acoustic receivers 18. It is assumed that the time of flight of the synchronization signal is effectively zero. The term "time-of-flight" refers hereinbelow to the elapsed time between the transmission and arrival of the acoustic time mark.

f. The measurement of the time of flight of the acoustic signal is performed by the positioning assembly 13 based on its own clock and the timing information provided by the data elements and calculated by the positional element 11 based on the positional element's clock. Since the clocks suffer a certain inaccuracy and continuous unequal drift there is a requirement to synchronize the clock. Therefore the data elements additionally comprise clock synchronization information.

g. The positioning system 10 preferably supports multi-user functionality, preferably both in the aspect of a single positioning assembly 13 being able to concurrently determine the positions of a plurality of positional elements 11, and the aspect of a plurality of positioning assembly 13 being able to concurrently determine the positions of a plurality of positional elements 11.

h. To support multi-user functionality the positional element 11 preferably comprises a plurality of modulation schemes. The positional element 11 preferably, from time to time, randomly selects a modulation scheme. Alternatively, the modulation scheme is pre-selected, preferably by a manufacturer. The data elements additionally and preferably comprise an identification of the modulation scheme of the current modulation frame.

i. Additionally to support multi-user functionality the data elements perform time-hopping to resolve collisions. The synchronization signal is transmitted within a continuous sequence of contiguous synchronization frames. Each synchronization frame is made of a fixed number of time slots, typically but not exclusively the number of time slots in a synchronization frame is 16. Each data element is transmitted within a sequence of time slots, wherein each such time slot is selected from a different synchronization frame, one slot per frame. The data element is therefore divided into packets wherein each packet is transmitted in one time slot. The time slot that carries the packet is randomly selected for each synchronization frame. Preferably, the data element is short and the transmission bit rate is high so that the entire data element fits into a single packet and hence into a single time slot.

j. The time length of all the time slots and all the synchronization frames for all of positional elements 11 is preferably identical except for the differences in their clocks due to inaccuracy, drift, etc. Each data element packet comprises the number of its time slot within the synchronization frame. Thus the positioning assembly 13 is able to measure the time length of the current frame and assess the difference between the its own clock and the clock of the positional element 11. Thus achieving the synchronization of the clocks of the positioning assembly 13 and the positional element 11.

k. The data elements additionally comprise information about other elements of the positional element 11 as is necessary for the specific application.

The abovementioned features will be further described below.

Figure 3:
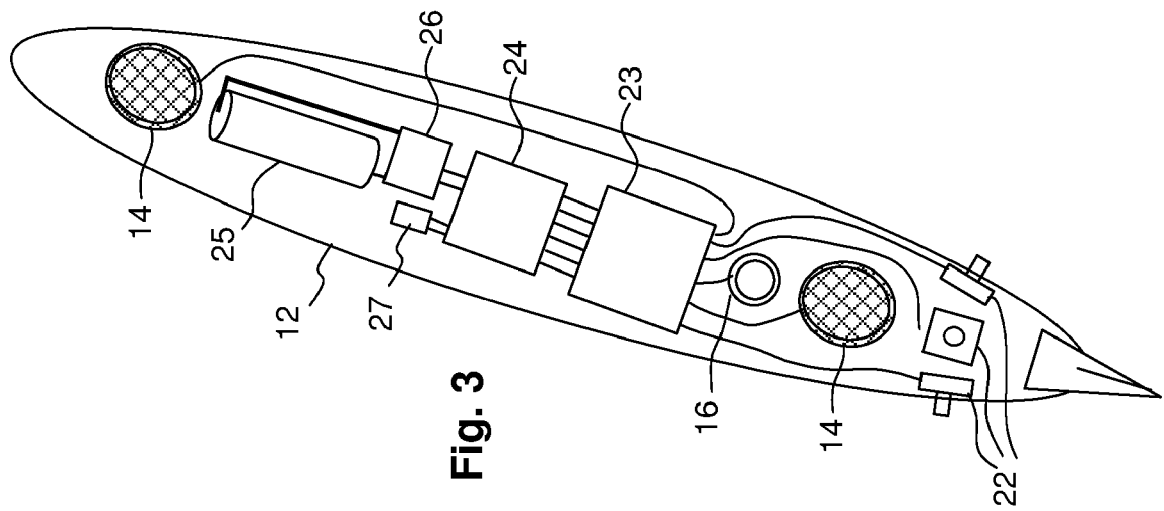
FIG. 3 is a simplified illustrations of another preferred embodiment of the positional device part of the acoustic positioning system of FIG. 1 enabling detection of the orientation in space of the positional device.
Figure 2:
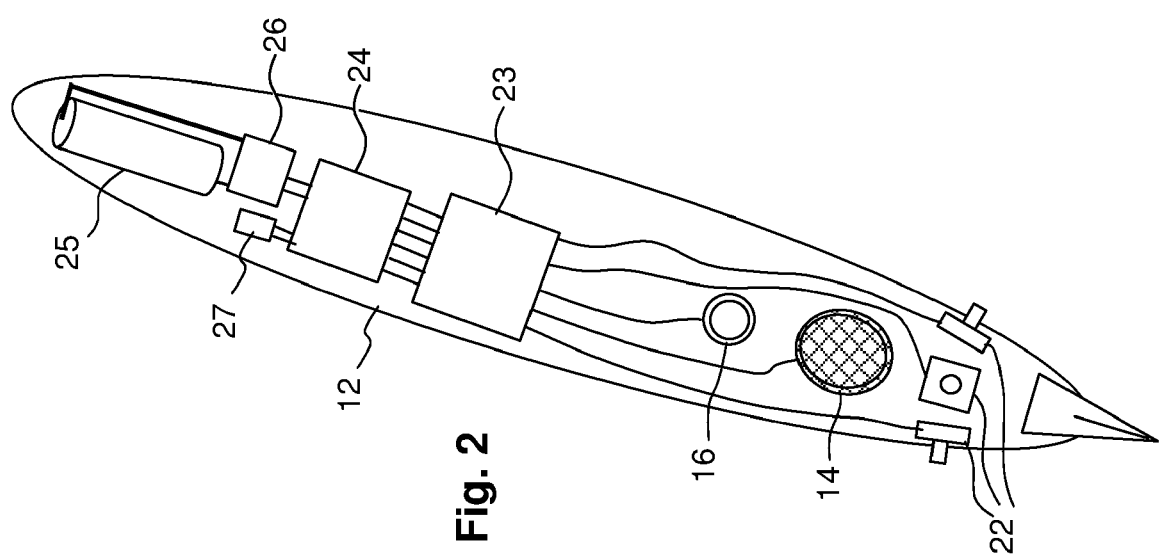
FIG. 2 is a simplified illustration of a preferred embodiment of the positional device part of the acoustic positioning system of FIG. 1.

Reference is now made to FIG. 2 and FIG. 3, which are simplified illustrations of two preferred embodiments of the positional device 12, differing by a second acoustic emitter 14 in the positional device 12 of FIG. 3. The second acoustic emitter enables the positioning assembly 13 (not shown in FIGS. 2 and 3) to determine the orientation of the positional device 12.

The positional device 12 of FIGS. 2 and 3 comprises the acoustic signal transmitter 14, the synchronization signal transmitter 16, and three push button intermittent switches 22, connected via interfacing electronic circuitry 23 to a microcontroller 24. Battery 25 provides power via power supply 26 and clock circuitry 27 provides timing signals.

Figure 4:
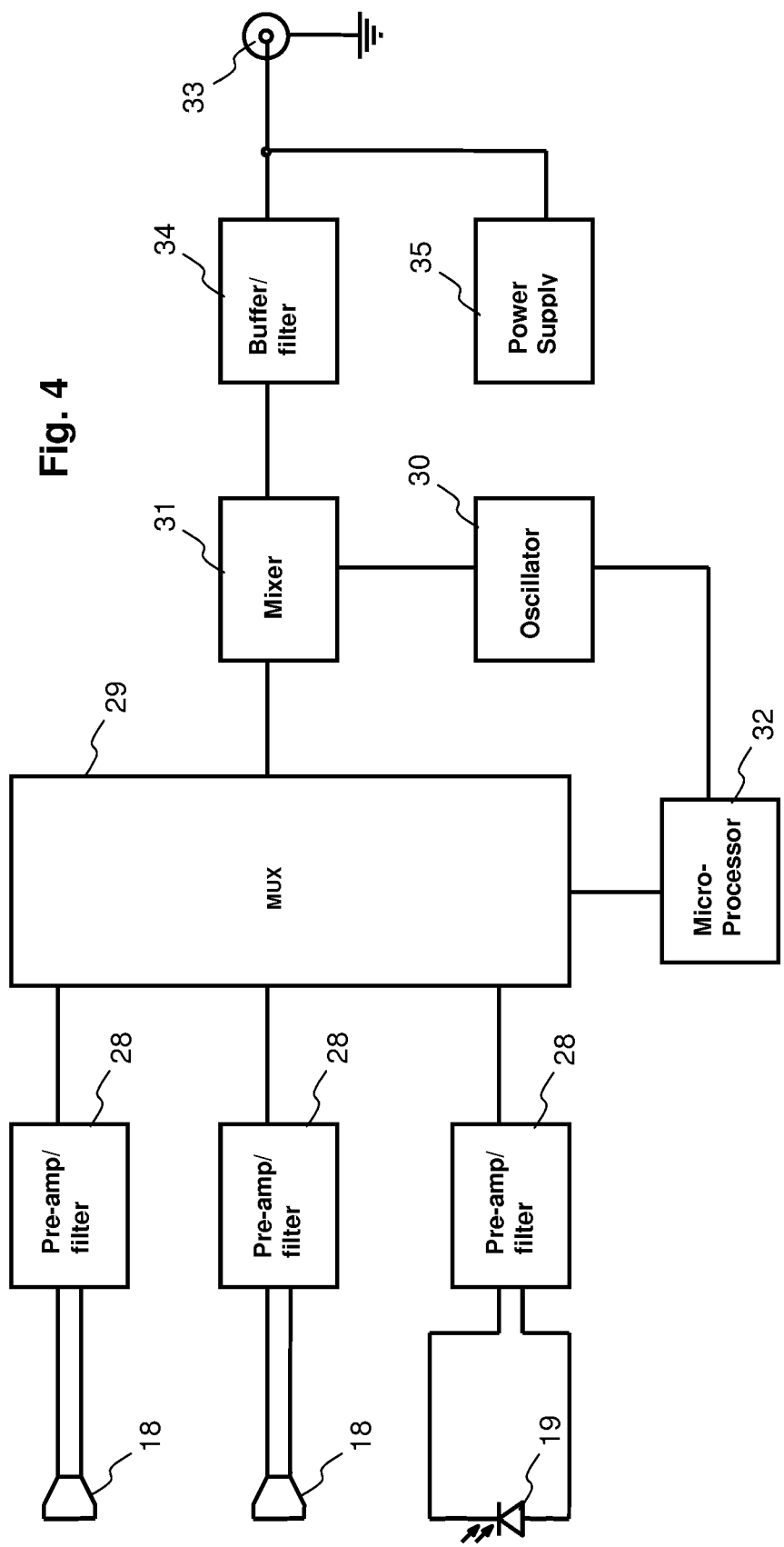
FIG. 4 is a simplified block diagram of a preferred embodiment of the positioning assembly part of the acoustic positioning system of FIG. 1 configured to interface with a computing facility.

Reference is now made to FIG. 4, which is a simplified block diagram of a preferred embodiment of the positioning assembly 13 configured to connect to a computing device (not shown). In the preferred embodiment of FIG. 4 the positioning assembly 13 is connected to the computing device via an analog input, preferably a microphone input or an audio line-in input, such as audio inputs of a PC. It is appreciated that other types of inputs, preferably digital inputs such as MIDI, USB and wireless inputs such as Bluetooth may also be used to connect the positioning assembly 13 to the computing device.

The positional assembly of FIG. 4 preferably comprises an array of acoustic receivers 18, preferably acoustic transducers such as microphones, typically at least two microphones to convert the acoustic signals transmitted by the acoustic emitters (not shown) back to electrical signals. A synchronization signal receiver 19, preferably an IR photodiode, detects IR synchronization signals transmitted by an IR synchronization signal emitter (not shown). Alternatively, an antenna may replace the IR photodiode to receive radio synchronization signal.

Pre-amp and filtering circuitry 28 is preferably provided for each of the acoustic receivers 18 and the synchronization signal receiver 19. Time or frequency multiplexing functionality 29 allows the signals to be multiplexed onto a single channel. Frequency down-conversion, using local oscillator circuitry 30 and mixer functionality 31 allows the signals as received to be converted downwards to frequencies compatible with an analog input of the computing device.

A microprocessor 32 or other controlling logic is used to control and coordinate the positioning assembly. The synchronization signal enables the microprocessor to synchronize the signaling components.

A cable and jack 33 are provided for connection to the computing device's microphone socket, or any other input having an A/D converter. Data into the analog input is preferably buffered and filtered by buffer and filter circuitry 34. Buffering may be different depending on whether a microphone socket or some other input is used.

Power supply circuitry 35 permits usage of the microphone jack simultaneously as a power source for the positioning assembly and for data output.

When using a host CPU to decode the positioning data transferred from the analog input, there is an inherent problem of synchronization. The clock of the positional element is not synchronized with the positioning assembly, which in turn is not synchronized with the computing device A/D converter. The synchronization of the positional element and the positioning assembly can be achieved with the synchronization signal as described herein. Synchronization further on down the line with the host time base is in many cases impossible. Even with a relatively high sampling rate such as 50 KHz, the mismatch between the synchronization signal and the A/D sample may be in the order of 20 uSec, which corresponds to a few centimeters in the measured location. Such imprecision is not suitable for most applications. Furthermore, even if good synchronization is achieved at a certain instance, the clocks of the two systems, namely the host and the positioning assembly, tend to drift over time due to limited accuracy of existing crystal technologies.

To overcome the above-described host synchronization issue, positioning assembly preferably uses a certain time or frequency slot to transmit to the host a synchronization pattern, which is at the Nyquist rate of the host A/D converter. The host can use the pattern to determine the phase difference between its own clock and the positioning time base clock.

The synchronization pattern can be transmitted at regularity sufficient to compensate for clock drift, and there is no need to send such a signal at every loop cycle.

In a further preferred embodiment, the positioning assembly sends commands to the positional element, whether by acoustic, light, infrared, RF or any other form of signal that the positional element is capable of responding to. In such an embodiment, the positional element 11 has RF or light receivers. Upon reception of a command, the positional element 11 may emit a signal such as the acoustic signal discussed above. The time of emission of the instruction from the positioning assembly is known, and can be used to start timing a delay in receipt of the acoustic signal. The respective delays of the acoustic signals at the different microphones can again be used to arrive at position co-ordinates.

Figure 5:
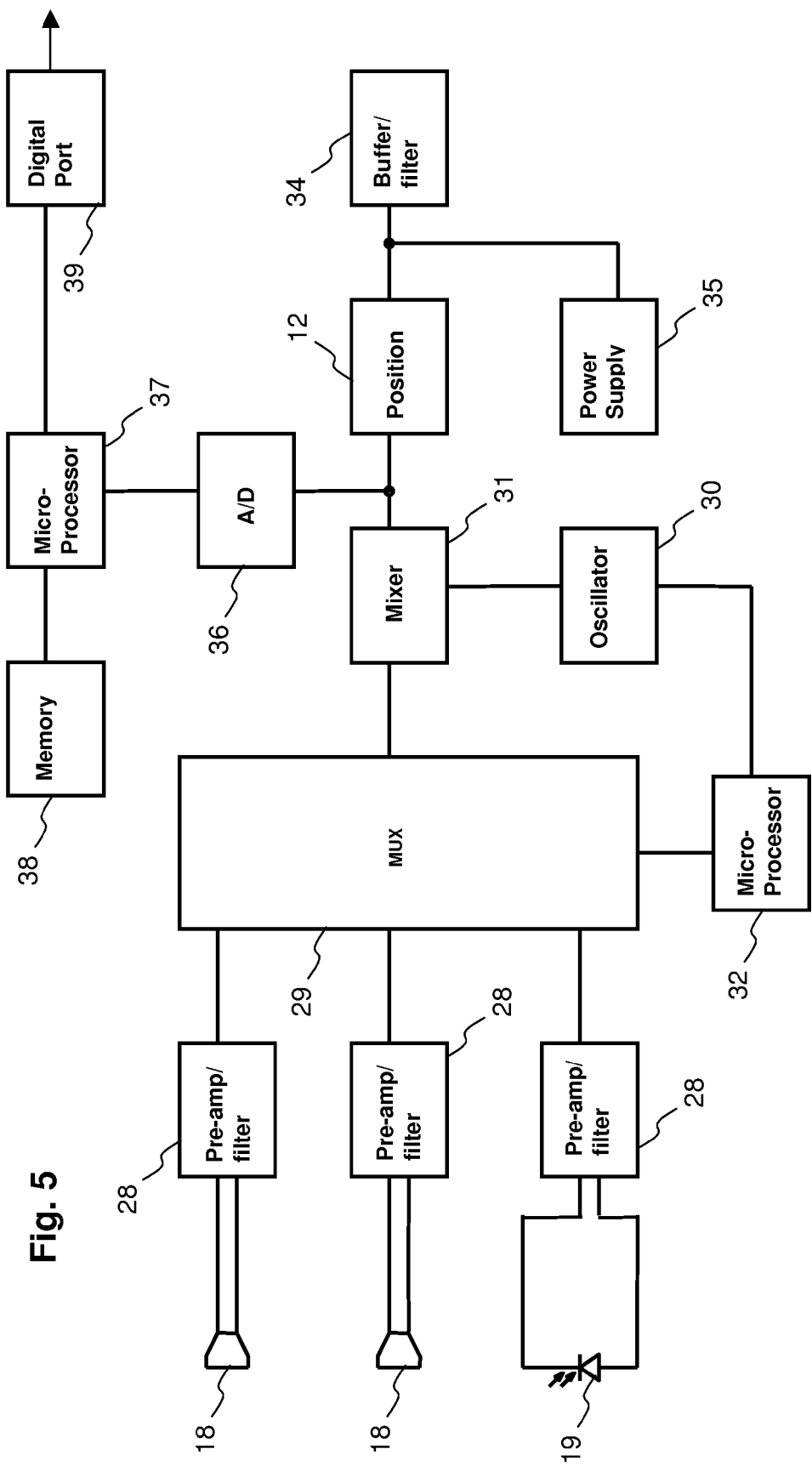
FIG. 5 is a simplified block diagram of another preferred embodiment of the positioning assembly part of the acoustic positioning system of FIG. 1 configured to include a computing facility.

Reference is now made to FIG. 5, which is a simplified block diagram of a preferred embodiment of the positioning assembly 13 configured to include a computing facility. Elements that are the same as in FIG. 4 are given the same reference numerals and are not described again except to the extent necessary for an understanding of the present figure. In FIG. 5, an A/D converter 36 takes the output of the down conversion 31 and provides it to microprocessor 37. Microprocessor 37 is connected to a memory 38 and a digital data port 39. The Microprocessor 37 carries out decoding of the acoustic signal waveform to determine the position of the positional element 11 and may additionally run applications using the positional information thus determined. The features are preferably provided within a positioning assembly chipset. The solution leads to a more complex and therefore more costly positioning assembly than that of FIG. 4. However, the circuitry can be dedicated for use with the signal to coordinate decoding algorithm to be described below, and thus is still relatively simple in comparison with currently available solutions.

A decoding algorithm is preferably provided to convert digitized versions of the positional element signals into position coordinates for passing to a local operating system or directly to an application or the like. The algorithm is preferably provided as part of client software for the computing device, either as a driver for the positioning assembly or built in to the local operating system or exceptionally as part of a specific application. In the embodiments of FIG. 5 the algorithm may be incorporated into the positioning assembly electronics.

The algorithm preferably takes into account the relatively low sampling frequency capabilities likely to be available by carrying out frequency down conversion. The conversion reduces the data frequency from the relatively high frequencies needed for transmission from the positional element to the relatively low frequencies that installed sound hardware is likely to be able to sample and digitize. In addition the algorithm preferably includes an ability to handle noise and is preferably adapted for specific issues in the handling of low frequency signals in general.

As mentioned above, the known art in the position location field concentrates on the use of very short and energetic acoustic signals as the location signal. In order to achieve good resolution, the known solutions dictate high sampling frequencies, typically higher than 400 KHz, in order to be able to find such short location signals and not miss them entirely. The present embodiments by contrast preferably do not use sampling rates higher than 44.1 KHz, since such frequencies are incompatible with the installed base of sound processing equipment. Furthermore, it is recommended to keep the beacon signal sound frequency higher than 20 KHz, that is within the ultrasonic range, so that users do not hear it. These two demands require a solution in which data is modulated over an ultrasonic carrier signal or waveform. The data can be frequency modulated (FM) or phase modulated (PM) onto the carrier comprising the ultrasonic signal, or any other known method may be used. The algorithm preferably operates to decode the modulated signal and to reconstruct the original position-information bearing signal from the results of sampling thereof. In the present embodiment it is preferred to use band-limited signals in order to achieve a desired resolution level.

Preferably, continuous wave (CW) modulations such as spread spectrum and frequency hopping are used, in acoustic position finding, to overcome reverberation and multipath effects.

Typically, more than one detector is used, and the signals from the detectors are multiplexed for a single input. In certain cases, the need for multiplexing may be avoided. For example, in the case of a stereo input Sound Blaster® or similar stereo sound card, one can feed two signals into the microphone input, and another two signals to the "Line-In" input, making a total of four signals that do not need to be multiplexed together. Thus, the positioning assembly does not require a time division multiplexer for input access purposes. Rather, up to four sensors may be fed directly to the sound card, and the Sound Blaster's® internal circuitry is then able to take care, using an appropriate software driver, of the received signals. It is noted, however, that even stereo input sound blasters have a maximum of two A/D converters, so that time division multiplexing is still needed to enable the sound card to carry out sampling over more than two channels simultaneously.

In order to enable the stereo input sound card to sample four separate channels over two A/D converters, the transmitted signals may thus be synchronized with each other by the positioning assembly. Such synchronization may be achieved in a number of ways. One way is to send synchronization data from or to the positioning assembly alongside the signals themselves. Another method requires cyclic transmission, that is to say the signals are sent in a coordinated manner so that a signal period or phasing between the channels that is known to both sides is used. The methods hereinbefore described thus provide data synchronization, both with and without an internal time division mechanism.

It is pointed out that the use of the separate stereo inputs, as described above, has certain drawbacks in comparison to other embodiments described hereinbefore. Thus for example there may be a phase difference between sampling carried out at each of the two A/D converters, and thus a calibration stage has to be performed before using the system. Otherwise, the phase difference itself may confuse the distance determinations, leading to reduced accuracy.

Another drawback is that relatively complex software driving functionality is required to keep switching timing between the microphone input and the "Line In" input as accurate as possible. A jitter of a mere 1 ?Sec between the switching timings can result in 0.3 mm of measurement inaccuracy at room temperature.

In addition much of the installed sound card base only allows for mono input. Very few sound cards are equipped for stereo microphone input.

Additional cost may be added because, in order to use the additional inputs, an additional connector and wiring have to be provided on the positioning assembly, which most users will not be able to utilize.

A preferred embodiment of the present invention uses a maximum likelihood detector for decoding the signals received from the sensors to determine the distances to the individual sensors. At the maximum likelihood detector, the signals received from the sensors, via the positioning assembly, are compared to reference signals. The comparison indicates a most likely signal and from the most likely signal a distance is determined as the distance from which the signal was most likely transmitted.

The maximum likelihood detector preferably uses a full mathematical model of the channel to construct a look up table of reference signals against which to compare received signals so that a best match distance can be found. As an alternative, the expected waveform can be sampled at the Nyquist rate, and any timing mismatch between the sampling points can be overcome by extrapolation functions, to reveal the distance.

Figure 6:
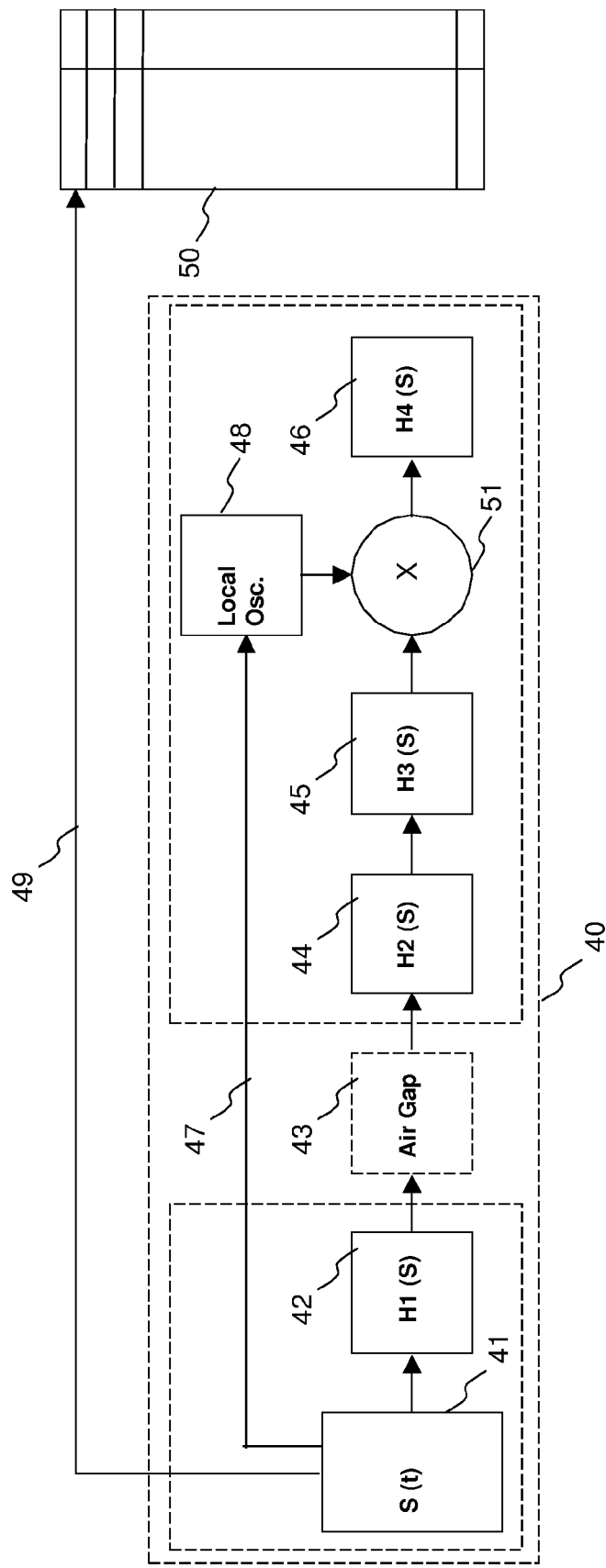
FIG. 6 is a simplified block diagram of a mathematical model of the acoustic channel between the positional element part and the positioning assembly part of the acoustic positioning system of FIG. 1.

Reference is now made to FIG. 6, which is a simplified block diagram indicating typical components of a mathematical channel model 40 for incorporating into a maximum likelihood detector of the kind considered above. The channel model 40 comprises an initial signal sequence S(t), referenced by numeral 41, which is fed into the transfer function H1(s), referenced by numeral 42, of the acoustic emitter within the positional element 11, followed by air gap 43, which is modeled simply as a delay. The air gap is altered for different distances. The result is then fed to the reception path in the positioning assembly 13, which includes transfer function H2(s), referenced by numeral 44, for the acoustic receiver, equalization H3(s), referenced by numeral 45, and low pass filtering H4(s), referenced by numeral 46, as well as mixing and any other features of the path. The full modeling of the channel is useful in the design of the maximum likelihood detector in that it allows accurate expected signals to be constructed against which the received signals ideally differ only in phase. The detector is then relatively easily able to distinguish the most likely signal, which in turn corresponds to the most likely distance.

The synchronization signal is used in the maximum likelihood based scheme both to set the start of the delay and also to synchronize clocks between the positional element and the positioning assembly. Synchronization path 47 is indicated on the model. Specifically, path 47 provides a synchronization signal to a local oscillator 48.

The skilled person will appreciate that acoustic signals have differing angular transfer functions. An equalizer can be added to the positioning assembly in order to compensate for this fact.

The synchronization signal preferably also points, via a second path 49, to a start time equivalent to a zero distance in a distance look up table 50. The most likely signal obtained by the maximum likelihood detector is then used to identify a most likely non-zero distance from the look up table. The skilled person will appreciate that, instead of a look-up table, it is possible to use an array generated on the fly. Furthermore, other detectors may be used; and there are several known decoders of FM signals, such as PLLs, I/Q demodulation, phase multiplication etc. The maximum likelihood distance may then be tested by means of correlation.

Alternatively and preferably the mixer 51 is replaced by Pass Band sampling having a sampling frequency that is smaller than half the maximum frequency of interest, preferably using analog anti-aliasing filters.

Also alternatively and preferably the mixer 52 is replaced by high frequency sampling having sampling frequency that is equal or greater than half the maximum frequency of interest, preferably using digital filtering. This embodiment eases the requirements on the analog filtering and enables the use of a decimation filter with frequency down conversion to provide overall data throughput similar to the previous alternative embodiment.

Figure 7:
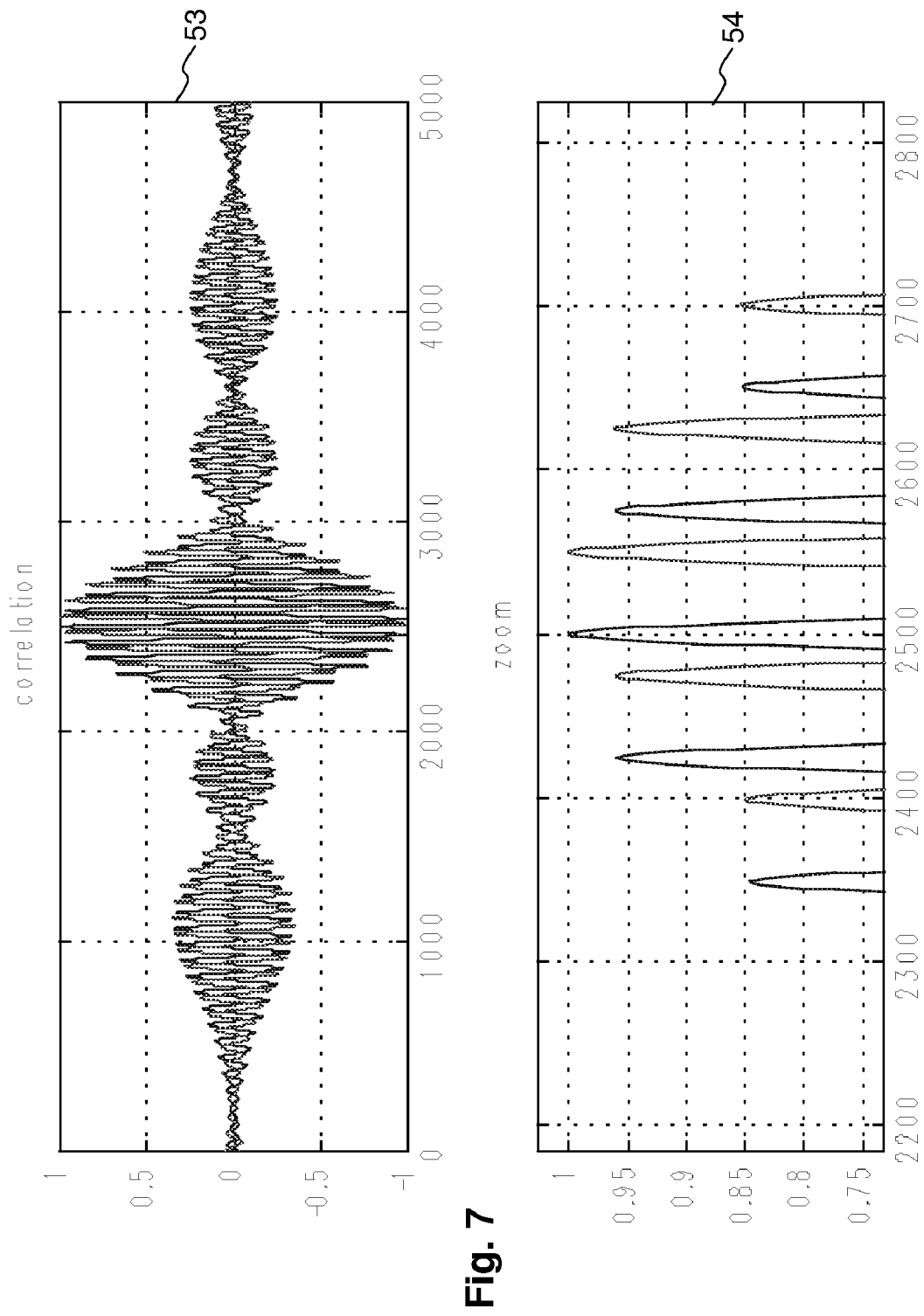
FIG. 7 is a two-part graph showing a typical correlation function associated with the channel model of the acoustic channel between the positional element part and the positioning assembly part of the acoustic positioning system of FIG. 1.

Reference is now made to FIG. 7, which is a two-part graph showing a typical correlation function that may be used. The top part 53 of the graph shows the function, and the lower part 54 of the graph is an enlarged or zoomed view of the upper central part of the graph.

Figure 8:
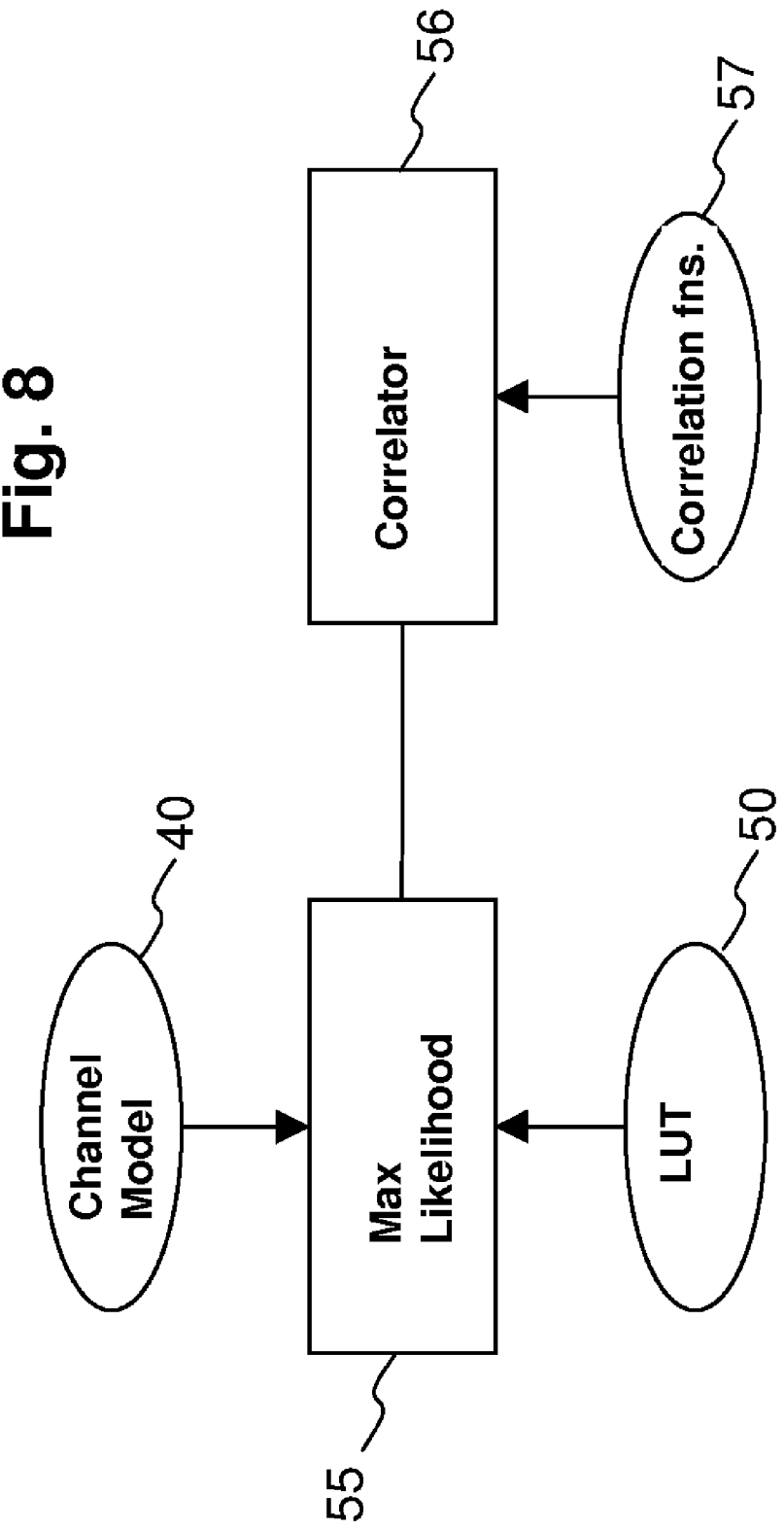
FIG. 8 is a simplified block diagram showing a decoding unit for carrying out decoding of the correlation function of FIG. 7 according to the channel model of FIG. 6.

Reference is now made to FIG. 8, which is a simplified block diagram showing a decoding unit for carrying out decoding as described above. The decoding unit comprises a maximum likelihood detector 55 that uses a channel model 40 as described with reference to FIG. 6 above, and look-up table 50. The maximum likelihood detector 55 is followed by correlator 56, which uses correlation function 57 to carry out correlation using the distance detected as most likely by the maximum likelihood detector 55, to confirm that the detected distance is correct.

Reference is now made to FIG. 9, which is a simplified illustration of a timing diagram of transmitting and receiving of the synchronization signal 17 of FIG. 1. The synchronization signal 17 is transmitted by the positional element 11 preferably as a sequence of data elements 58. Each data element is preferably transmitted as a single packet 59. Each packet 59 is preferably transmitted within a slot 60 of a synchronization frame 61. Each synchronization frame 61 preferably comprises a fixed number of slots 60, typically 16 slots per frame.

It is appreciated that a packet 59 may be larger than can be fitted into one slot 60. In this case the packet can be subdivided and transmitted within several slots as necessary. However, preferably, the data element is short, and the transmission bit rate is high, so that the entire data element fits into a single packet and the packet fits into a single time slot, as is shown in FIG. 9.

The synchronization frames 61 are of equal time length and follow each other immediately. The positional element selects one slot from each subsequent frame to transmit the data element until the entire data element is transmitted. The slot is selected randomly within each frame. This time-hoping mechanism is useful to resolve collisions between two or more positional elements operating close to each other.

The procedure for estimating the actual rate of the clock of the positional element in terms of the clock of the positioning assembly is as follows. In the description below the data element fits into a single packet that fits into a single slot.

1) The positioning assembly preferably comprises a free running timer. Upon receiving a valid packet header (0x55), the value of this timer is sampled and is referred to hereinbelow as "Packet Time Stamp" (PTS).

2) The PTS is preferably delivered to the application layer together with the received packet data.

3) The packet also preferably includes a "Time Slot" field, which indicates the position of the time slot relatively to the beginning of its Frame. The time slots are preferably changed for every frame, preferably by using a CRC-8 as a pseudo-random generator. The purpose of this randomization is to minimize the effect of periodic interferers in the synchronization channel.

The algorithm for synchronizing the clocks is as follows: The clock estimator calculates the differences between the transmitter clock and the receiver clock. Since the differences are mainly due to crystals inaccuracy, the estimation is basically a fit of linear data. The linear fit slope units are measured in parts per million (ppm). The synchronization algorithm is implemented also to adjust to changes that occur due to temperature effects. The performance of the estimator is better than 30 nSec, which corresponds to approximately 10 μm.

In the example of FIG. 9 the positional element uses 16 time slots per synchronization frame. In the frame shown in FIG. 9 the positional element transmits the packet in the seventh slot. The positioning assembly receives the stream 62 of frames 63, which are the same as the frames 61, except that their time measurements are different due to clock rate differences between the positional element and the positioning assembly. The positioning assembly receives packet 59, and samples its internal timer, creating a PTS, upon receiving a correct packet Header. The packet and the corresponding PTS value are then passed to the software layer for clock recovery.

In the example provided in FIG. 9, the clock of the positioning assembly is faster that the clock of the positional element and thus the length of the frame 63 is longer than expected. Therefore the positioning assembly is able to estimate the difference between the clocks and accurately calculate the time of transmission of the time mark of the modulation frame from the contents of the packet.

It is appreciated that there is no forced synchronization between the positioning assembly and the positional element and each is performing its own state machine independently. Also, other positioning elements can transmit their data at random time. It is the algorithm that keeps track of the different positioning elements as they enter into the range of the positioning assembly.

As can be understood from the discussion above, the synchronization signal, particularly the data element, is preferably a digital signal. The synchronization signal preferably supports the following features and considerations:

1) Power consumption is a consideration, especially for the positional element. To provide minimum power consumption the bit rate should be high as possible, preferably above 1.25 MBit data rates.

2) To further conserve power the amount of data transmitted should be minimal.

3) To further conserve power and reduce cost the entire communication scheme is simplex, the positional element typically does not comprise a receiver, and the positioning assembly does not sent requests to re-transmit lost information. The acoustic positioning system should endure data loss in excess of 80%.

The following table presents a preferred packet structure featuring small size and high endurance. In the example presented in the table below the synchronization data element fits into the packet.

| Field | Value | Size [Bits] | Description |
| --- | --- | --- | --- |
| Header | 0x55 | 8 | Allows receiver synchronization |
| Packet Structure | 0 | 2 | Minimal size packet ID. |
| Pen ID | | 6 | Defines also the acoustic signal. Value not equal to 0x3F. |
| Time Slot | | 4 | Pseudo random synchronization, calculated by taking 4 LSB's of a cycles counter over CRC-8. |
| IR Packet Number | | 4 | Counts modulo 15 IR packets. |
| Switch 3 status | | 1 | The current switch status |
| Switch 2 status | | 1 | The current switch status |
| Switch 1 status | | 1 | The current switch status |
| Switch 0 status | | 1 | The current switch status |
| Switch change counter | | 4 | The number of consecutive packets with same Switch3-0 value. The counter doesn't roll over, but saturates at 6 (to avoid 0xFF). |
| CRC | | 8 | Redundancy check CRC-8 algorithm. |
| Total Number of bites | | 40 | |
| Including Start/Stop | | 50 | |

The positional element preferably additionally transmits, typically and preferably within the synchronization data elements, information regarding other peripheral components of the positional element, such as the status of switches, as seen in the above table.

Preferably the positional element transmits the status of the peripheral components within each data element, preferably within each packet. Preferably, the status are accompanied by a switch change counter, which preferably counts the number of packets transmitted since the last change of a switch. In the example presented in the above table, the counter increments by one for each packet. Once the counter reaches a predefined maximum value, which is in this example the value 6, the counter remains at this value until a change in one of any of the monitored switches occurs. At this time the counter is be reset to 0. Thus, the positioning assembly can assess the status of the switches at any time, at the accuracy of the rate of transmission of the synchronization packets, even when some of the packets are lost.

In the example presented in the table below, a switch has changed its status at Frame n−3 (counter equal to 0). In the next frame, the counter increments to 1 (since there are no new changes in the switches status). Frame n−1 is totally lost, probably due to interferers. Frame n enables the positioning assembly to recover the data of Frame n−1, since the counter of the switches is incremented by 2 from the last received packet. The conclusion is that the switch status of frame n−1 is 0x72.

| Field | Frame n-4 | Frame n-3 | Frame n-2 | Frame n-1 | Frame n |
| --- | --- | --- | --- | --- | --- |
| Header | 0xAA | 0xAA | 0xAA | None | 0xAA |
| Packet Structure & ID | 2 | 2 | 2 | None | 2 |
| Time Slot & Packet Number | 0xD1 | 0x32 | 0xF3 | None | 0x15 |
| Switch Status & Counter | 0xF7 | 0x70 | 0x71 | None | 0x73 |
| CRC | 0xC1 | 0x57 | 0xEA | None | 0xD2 |

If an interferer makes the data inconsistent with the CRC, the data is dumped, unless the positioning assembly is able to recover the data using the CRC. The algorithm checks the integrity of the data before actually using it. For example, if the recovered timing of a packet is too far from the expected, the data of this particular packet is dumped.

Additional coding of the acoustic signal can be used for greater signal robustness and also to minimize interference with neighboring users. The latter has several benefits. It allows multiple users to use the same positioning assembly, or it may allow a single user to use several pointing devices, for example in a game such as chess. If each playing piece is a different pointing device and signal decoding allows the different pointing devices to be distinguished then the system is able to incorporate multiple playing piece games. Minimizing interference with neighboring users may further allow the co-existence of multiple users in the same room.

One of the preferred ways of minimizing interference between different pointing devices is by using pseudo-random frequency hopping algorithms. Each mobile unit preferably has a pseudo-random frequency hopping sequence incorporated within an encoding unit (connecting between elements 23 and 24 of FIGS. 2 and 3 but not shown or preferably within microcontroller 24). The positioning assembly, or a decoding unit as preferred, has a corresponding de-hopping unit which is able to synchronize on the same hopping sequence. A preferred embodiment provides synchronization by using the IR, or other electromagnetic signal, to transfer the hopping sequence to the positioning assembly. Another preferred embodiment uses factory calibration to provide a sequence.

One of the applications that can be realized with a position detection system based on frequency hopping is integration of the positioning assembly and WLAN (wireless local area network). The result is a WLAN access point with positioning capabilities, able to support multi users and able to manage each of the users data separately. The users are able, for example, to write on paper or on their own electronic pads using pointing devices belonging to, or compatible with, the WLAN. Unseen, the WLAN traces the movements of each of the users separately and produces networked electronic versions of each of their handwritten documents. For the purposes of writing on paper, the pointing device is a combination of the pointing device and a standard pen.

Customer and application needs vary, and individual applications may require maximization of particular variables in relation to others. For instance, in certain applications, accuracy may be of less importance than power consumption, and thus possible accuracy levels or the number of detectors in operation may be reduced in favor of reduced power consumption. In order to allow such system-specific optimization without manufacturing a range of similar devices, a flexible programmable scheme is preferred, both for the positioning assembly and for the mobile unit.

Flexible programming may be performed by burning fuses or by use of non-volatile memory (as ROM or EEPROM). Typical data for setting in this way includes sampling rate per second, transmission power, two-dimensional or three-dimensional application, and the like.

The positional element may additionally be supplied with a pressure sensor, whose output can be used by appropriate applications to allow graphical or security features. For example a line may be drawn differently depending on the pressure applied. A suitable pressure sensor for incorporation into a pointing device may comprise a digitizer (10 bits or less), a strain gauge and a driving circuit.

Yet another feature may include the ability to measure the angle of the mobile unit (useful for instance in digital stylus applications). A suitable angle sensor for incorporation into the positional element may comprise a tilt gauge, digitizer and driving circuit. In a further embodiment, two position indicators such as ultrasonic loudspeakers may be placed at either end of the pointing device, each transmitting in a manner that renders the signals distinguishable. The angle of the pointing device may then be derived by calculating each of the positions and performing simple geometry between them.

Stand Alone Positioning Assembly

As mentioned above, in the embodiment of FIG. 4, the positioning assembly includes the ability to decode signals without the support of the host computing device.

The decoding algorithm described hereinabove does not require especially powerful processing power and it is thus feasible to include a limited resource CPU into the positioning assembly without increasing the overall cost. In a preferred embodiment, a computation power of ~1 MIPS is used to decode the signals. Such low computation power can in fact be integrated into a single customized positioning assembly chip, or as a low cost add-on. The use of such a CPU allows a more conventional connection to hosts, such as: UART, USB, Serial and others since the signal that is transferred is the processed result of the positioning and not the raw signals. Such an output is also suitable for direct use within WLAN and Bluetooth. Such a stand-alone positioning assembly preferably includes a digitizing element, (A/D converter), a CPU, a memory and interface circuitry.

Reference is now made back to FIG. 3 in which two acoustic emitters are mounted preferably at two sides of a positional device to enable detection of the orientation of the device. Each acoustic emitter issues a separate waveform that is separately detected and the orientation of the positional device is determined by drawing a straight line between the two positions. Preferably, the two acoustic emitters are able to identify themselves to the positioning assembly and to operate simultaneously. The respective signals of the two acoustic repeaters may be time or frequency multiplexed to work together and in one preferred embodiment the two acoustic repeaters use frequency hopping, each using a different pseudo-random sequence. The positional element can use a single synchronization emitter to provide synchronization for both modulation frames.

Electromagnetic Positioning

Another method that can be used with the microphone input is electromagnetic positioning. A board with orthogonally arranged magnetic loops (conductors) serves as a writing pad. A pointing device emits electromagnetic signals, which are picked up by the pad's magnetic loops. By analyzing the signals, the pointing device's position can be calculated. The loops can be printed onto a PCB and can be made small enough to give any desired level of precision.

The pointing device is the same as described above except that the synchronization signal emitter is an electromagnetic transmitter including an emitting antenna and associated modulating circuitry. The synchronization signal receivers of the positioning assembly comprises built in loops as sensors with RF demodulating circuitry but otherwise is the same as the positioning assembly described above. The decoding algorithm again has to deal with a different kind of information part of the signal but otherwise covers the same issues as those discussed above.

The positioning system of the present embodiments has a wide range of applications, a few of which are listed below. Preferably a single electronic device is manufactured, and is set up in different ways for the chosen application, possibly by the use of jumper or dip-switches. The switches may allow configuration of the system for the most appropriate trade-offs for the given application. In some applications low power consumption is important. In others accuracy of positioning is critical. In yet others, accuracy is less important than rapid updating and the number of samples per second. In others range is important, and in yet others the ability to accommodate large numbers of users may be critical.

In the following, a number of applications of the above-described technology are considered.

Multi-User Positioning System

A multi-user positioning system embodiment of the present invention preferably comprises a WLAN system with an embedded positioning assembly according. A plurality of users in the conference room has a positional element each. Each positional element has its own unique identity as described above. The various positional elements transmit continuously modulated waveforms accompanied by synchronization signals. The waveforms are detected by the multi-user positioning system. The waveforms may additionally be tracked by tracking systems local to each user, preferably within their cellular telephones. In addition the conference table itself may have a master positioning assembly combined with the conference room telephone facility.

Toy Applications

Toys with positioning can be divided into three sub-categories, to be explained below: front of screen games, front of computer games, and computer free environments.

Front of Screen Games are games in which user interaction is directly with the computer screen, for example:

Toy Finger:—a toy pointing devices for toddlers or children to point at computer screens in order to interact with the website or program. Touching the screen with the pointing device launches a cartoon website inside the member zone of the toddler. The pointing device also enables the user to interact with objects appearing on the screen. The pointing device, preferably in the form of a pointing finger or cartoon character, and technologically a digital pen, has its unique identity, according to any of the above embodiments.

Toy Bird:—A game is provided in which the user flies a bird to a nest located in upper right hand side of the screen in order to receive points or applause. The implementation is as for the pointing finger above.

Wireless Joysticks—A possible application of the technology is a wireless joystick for computer games. Joysticks have applications across the computer game industry.

Front of Computer Games—Front of computer games are games where interaction happens in the vicinity of the computer, or for that matter the PDA, cellular telephone, or an element attached to the computer as can be understood from the following example.

Battlefield Game—A board preferably representing a battlefield in which two opponents join battle. Playing pieces, each comprising a positional element, represent soldiers and weapons, which advance towards each other and fight. Certain aspects of the game occur only on the screen. For example if one of the players advances his soldier to a specific location containing a mine, the resulting explosion occurs on the screen. A positioning assembly embedded within the computer or an element attached to the computer receives the unique positioning coordinates of each and every soldier, vehicle, etc. and coordinates it using a war plan application on the computer.

Computer Free Environments—Computer free environment games are games that do not require a PC because they themselves carry a sufficiently powerful CPU.

Battlefield Games—as above but standalone, without the computer.

Positioning enabled toy cars—A car follows or otherwise interacts with another car. A first car has a positional element while a second car has a positioning assembly. The second car is thus able to follow the first one or otherwise interact therewith.

Independent Robots

Independent robots keep track of each other's position and the position of a ball and transfer the ball between them. Each robot has a positional element for the robot as a whole and additional positional elements for each limb whose position is needed for the kind of maneuvers intended. In one embodiment each robot includes its own standalone positioning assembly and makes its decisions based on incoming positional data from itself and from the surrounding robots. However in a second preferred embodiment each robot has only positional elements and control circuitry. Tracking is carried out by an external positioning assembly, which then instructs the robots on how to move. Thus only a single intelligent device need be provided and the robots can be relatively unsophisticated.

In one preferred embodiment, one robot transfers a ball to a second robot. The second robot takes the ball and transfers it to a third robot.

In another preferred embodiment a joystick controls the movement of a robot while the other robots automatically try to catch him based on his positioning. The application can make use of two-way communication, as explained elsewhere herein.

Positioning Enabled Building Blocks

Building blocks are each equipped with a uniquely identifiable positional element. A user can build various constructions interactively, receiving computer guidance during the course of building.

Command & Control Gloves

Command and control gloves for virtual reality or like games. Each limb of the glove is provided with position location ability according to the above embodiments. In accordance with the present embodiments such positioning ability can be provided simply by attaching a sensor to the end of each finger of a regular glove. Thus each finger is provided with separate positioning ability to be read as desired by the game application. Alternatively or additionally, rings on the fingers may provide wireless terminals or straps may be applied on any part of the body of the user or on items or accessories used in the game.

Inventory Application

An inventory system according to a preferred embodiment of the present invention comprises positional elements embedded in items of stock and a positioning assembly to track the movement of the stock items.

Manufacturing Application

A manufacturing line employing robots according to a preferred embodiment of the present invention comprises positional elements embedded in each robot and a positioning assembly that keeps global control of the robots. Each robot may have a positional element for the robot as a whole and positional elements for each limb whose position is needed for the kind of maneuvers intended. In one embodiment, where robots need to interact with each other, each robot includes its own standalone positioning assembly and makes its decisions based on incoming positional data from itself and from the surrounding robots. However in a second preferred embodiment each robot only has positional elements and control circuitry. Tracking is carried out by the external positioning assembly which then instruct the robots on how to move. Thus only minimal number of intelligent devices need be provided, and relatively unsophisticated robots can provide group behavior.

Higher precision can be achieved by putting additional wireless terminals in the detection space, at pre-determined locations. Measuring these units will calibrate the absolute measurement of the moving terminals so that a greater precision can be achieved.

Security Application

A pointing device with a positioning assembly according to a preferred embodiment of the present invention can be incorporated into an electronic identification scheme. Personal written signatures are often used for identification but a skilled forger is able to copy other persons' signatures. A forger however, copies the outward appearance of the signature and not the way in which the user applies pressure to the pen or holds the pen, say at a given angle on a given part of the signature. A pointing device, that the user can use as a pen to write on paper, and which can supply not only movement information but also pressure and attitude information, provides an enhanced security personal signature. Systems for obtaining signature information which incorporate pressure as well as the outward appearance are in use, however, use of preferred embodiments of the present invention makes such a system cheaper and more flexible. In addition, attitude information of the pen allows for greater verification. The orientation of the pen can be measured by adding an additional angle sensor to the pen. The angle sensor may comprise an accelerometer or may use an additional location signal transmitter on the other side of the stylus, as described above. In the latter case, the positioning assembly determines the XYZ locations of the two transducers, from which the angle of the stylus can be calculated. The angle is then used as additional factor and results in an electronic version of the signature, which is a triplet of three vector values (XY location, pressure, and angle).

The following embodiments describe an enhanced identification apparatus, which integrates positioning with other security methods.

Usage of a pointing device in the form of a stylus as an authentication means. A group of styluses are provided as part of the system. One of these styli is provided to each of an identified group of users and each stylus is provided with its own electronic identity.

By identifying the stylus, the user presently interacting with the system is identified and this allows verifiable usage of the system in security-wise applications. The user may also be required to provide his usual signature, which may be electronically verified based on movement and applied pressure or the like.

For greater security, a stylus can also be provided with a feature to enable a digital signature, for example based on the Public Key Infrastructure (PKI). The user may sign with his usual hand-written signature. Once the hand signature is verified, the system uses the stylus to provide a digital signature to the document using a PKI algorithm. Such a feature requires 2-way communication between the pointing device and the positioning assembly, which can be provided using available IR or RF channels. The electronic signature thus provides a guarantee both that the personalized stylus was used and that the authorized user was verified.

As an alternative or in addition to the above, a keypad may be added to allow the user to enter a personal identification number (PIN).

As a further alternative or in addition to the above, the system may further incorporate a biometrics sensor to the stylus or the positioning assembly to increase the security level. The biometrics sensor may be for fingerprint recognition, retinal signature recognition, voice signature recognition and the like.

Additional Stylus Applications

A stylus or digital pen may additionally be used for:

Remote control—The position of the stylus may be tracked and used to exert control over a system. Thus pointing to a device may appear to make it operate. Twisting the stylus whilst pointing may affect the operation of the device.

Wristwatch phones may be supplied with a miniature stylus to write on the face of the phone or on an adjacent small pad attached thereto. Alternatively writing may be carried out on regular paper and the watch located nearby to track the stylus movement.

The stylus may be used to provide SMS messages instead of having to type them in through the keyboard and/or may provide the ability to sketch and send the sketch as a file. Likewise the stylus may be used to input a telephone number which is then dialed. The same idea may be applied to conventional telephones.

The stylus may be used to enable writing for data input etc to other devices such as cash registers, gaming devices, Cable TV, refrigerators, etc.

The stylus of the security application discussed above can be used as part of a cheque or credit card signature authentication in front of a point of sale device.

Speaker pen—Provided the computing power is available, upon writing, it is possible to provide an application in which the pen writes and the application speaks the written notes. Applications for recognizing handwriting are well known, and applications for electronic voicing of writing are known. The combination of the two with the stylus of the present embodiments provides a way of reading back handwritten notes. The application may be located in the positioning assembly or attached computer. If using the embodiment in which transmission back to the pen is possible, then the pen itself can speak the written notes.

Combined digital pen and translator—the pen writes and translates the output into other languages.

Any combinations of the above.

A standalone device serving as the Positioning assembly, has its own screen and preferably is networked, via Bluetooth, Wireless LAN, regular LAN or the like to printers and other devices. The arrangement provides a full range of coverage from hand input to final printed or any other form of output.

Miscellaneous Applications

Gun aiming device—by mounting two positional elements on a game device in the form of a gun or a similar device. Preferably, one positional element is mounted on the end of the device and the other is mounted as far as possible on the a virtual line parallel to the nozzle of the gun. The two positional element send orthogonal codes (or codes having low cross correlation). The positioning assembly is associated with a screen, preferably on one of the corners or right above the screen and has at least three microphones. The positioning assembly estimates the virtual line from the two positioning elements on the gun, to the screen. The status of buttons pushed on the gun are transferred via the IR link, together with the synchronization data.

3D Stereo—by placing the wireless transmitter on a person the stereo can choose how to direct different volume or sound from different speakers to give the person wherever he is in the room a complete and real surround experience. Stereo direction as such is known but can be greatly simplified by using tracking according to the present invention.

Video Tracking—Based on the same principle as stereo tracking, tracking may be used in association with a PC video cam to automatically follow a person who is being filmed. The embodiments are of course extendable to any video system and can be especially useful for video conferencing, etc.

Exterior and interior positioning system for cars—for example, having elements inside the car controlled or known about by keeping track of their position.

Tracking device—a standalone positioning assembly device with a screen directing the user to the location of an object in its vicinity. The system may indicate the identity and location of these objects on the screen. The system may be useful in a room for finding keys and other personal items.

Two-way network system—The system comprises a series of device having both a transmitter and receiver. Each device locates and registers each other device it is aware of and between them they build a virtual network. The network may be built amongst themselves or may additionally use a smart hub. The result is a radio-based network whose range is far greater than the range of any of the individual objects. Each object has the exact co-ordinates of neighboring objects and thus can use directional transmission to improve range or spectral efficiency and the network can be used to deliver data to any point or to obtain from any participant object the whereabouts of unrelated network objects and so forth. The network can be connected to other like networks or can have a point of access to a wider network. The individual elements may be provided with their own identities and the system is useful for providing real time tracking of teams of men and simultaneously providing them with an intercom system.

A scaled down version of the inventory system may provide an Out of Range alert. A positional element may be provided on lose items temporarily provided to customers, for example earphone headsets provided to airline passengers. If the customer takes away the item then an out of range alarm is set, allowing for the errant device to be found.

A user may have a personal locator that activates doors, lights and appliances. Likewise communications equipment can be directed, by tracking of the personal locator, to divert calls to the nearest fax machine, etc. Both tracking and management of the communication transfer are preferably managed over a LAN, or WLAN. The personal locator can itself tell the user about incoming calls and other communications and give the options for receiving the communication. In the WLAN version, the positioning assembly is preferably part of the WLAN infrastructure.

It is expected that during the life of this patent many relevant positioning devices and systems will be developed and the scope of the terms herein is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A position detection system for use in association with computing applications, said position detection system comprising:
    at least one positional element for attaining a position, said positional element comprising:
        at least one first emitter for emitting a substantially continuously modulated acoustic waveform decodable to fix said position, and
        a second emitter for emitting a synchronization signal;
    a positioning device operative to determine a position of said positional element, said positioning device comprising:
        an arrangement of at least one of a first detector operative to detect said continuously modulated acoustic waveform in a manner permitting fixing of said position and outputting said waveform for computation, in a manner retentive of said position fixing ability; and
        a second detector operative to detect said synchronization signal;
said synchronization signal being transmitted within a time frame having a fixed duration and being continuously repeated, said time frame being known to said positioning device, said synchronization signal being a sequence of at least two synchronization sub-signals, each synchronization sub-signal bearing timing data for said continuously modulated acoustic waveform, thereby to improve accuracy of said fixing of said position, said at least two synchronization sub-signals allow said positioning device to derive clock synchronization data by correlating said timing data and said known time frame duration.

2. A position detection system according to claim 1 wherein said acoustic waveform is an ultrasonic waveform.

3. A position detection system according to claim 1 wherein said synchronization signal is an electromagnetic signal.

4. A position detection system according to claim 1 wherein said synchronization signal is an infrared signal.

5. A position detection system according to claim 1 wherein said synchronization signal is a radio signal.

6. A position detection system according to claim 1 wherein said timing data comprises a measure of time elapsed between an identifiable component of said acoustic waveform and time of transmission of said synchronization signal.

7. A position detection system according to claim 6 wherein:
    said positional element additionally comprises a first clock;
    said positioning device additionally comprises a second clock; and
    said synchronization signal comprises clock synchronization data useful to synchronize between said first clock and said second clock.

8. A position detection system according to claim 1 wherein said synchronization signal additionally comprises identification data of said positional element.

9. A position detection system according to claim 1 wherein said synchronization signal is transmitted within at least one time slot, said one time slot being randomly selected from a fixed number of time slots provided within said time-frame.

10. A position detection system according to claim 9 wherein said synchronization signal additionally comprises identification data of said time-frame and identification data of said time slot within said time-frame bearing said synchronization signal.

11. A position detection system according to claim 10 wherein said time-frame identification data is a counter of said time-frames and said time slot identification data is a location numeral of said time slot within said time-frame bearing said synchronization signal.

12. A position detection system according to claim 10 wherein said time-frame has a duration, said duration being known to said positioning device and wherein data of said clock synchronization is derived by said positioning device by correlating a received time-frame duration and said known time-frame duration.

13. A position detection system according to claim 12 wherein said clock synchronization data is derived by linearly interpolating a sequence of respective received time-frame durations and said known time-frame duration.

14. A position detection system according to claim 12 wherein said clock synchronization data is derived by using a phase lock loop between a sequence of respective received time-frame durations and said known time-frame duration.

15. A position detection system according to claim 1 wherein said acoustic waveform is selected from a predefined set of acoustic waveforms wherein said synchronization signal additionally comprises an identification data of said selected acoustic waveform.

16. A position detection system according to claim 1 wherein said modulation is an amplitude modulation.

17. A position detection system according to claim 1 wherein said modulation is a frequency modulation.

18. A position detection system according to claim 1 wherein said modulation is a phase modulation.

19. A position detection system according to claim 1 wherein said synchronization signal comprises an error correction code.

20. A position detection system according to claim 19 wherein said error correction code comprises at least one cyclic redundancy character.

21. A position detection system according to claim 1 wherein said synchronization signal additionally comprises identification data of a change of a status of at least one discrete input.

22. A position detection system according to claim 21 wherein said discrete input is a state of a switch.

23. A position detection system according to claim 21 wherein said synchronization signal additionally comprises a measure of time elapsed between said change of status of said discrete input and transmission of said synchronization signal.

24. A position detection system according to claim 23 wherein said measure of elapsed time comprises a count of said synchronization signals transmitted between said change of status of said discrete input and said transmission of said synchronization signal.

25. A position detection system according to claim 24 wherein said count of said synchronization signals is limited and when said limit is reached said count remains at said limit until a next occurrence of a change of status of a switch.

26. A position detection system according to claim 1 wherein said synchronization signal additionally comprises at least one measurement data of at least one of an analog input and a digital input.

27. A position detection system according to claim 1 wherein said first detector arrangement comprises a single detector.

28. A position detection system according to claim 1 wherein said first detector arrangement comprises at least two detectors and is operative to determine said position in two dimensions.

29. A position detection system according to claim 1 wherein said first detector arrangement comprises at least three detectors and is operative to determine said position in three dimensions.

30. A position detection system according to claim 1 wherein said positional element is associated with at least one of a computer pointing device and a writing device.

31. A position detection system according to claim 1 wherein said positional element is associated with at least one of a mobile device and a portable device.

32. A position detection system according to claim 1 wherein said positional element is a plurality of positional elements.

33. A position detection method for measuring a position of a positional element by a positioning device, said method comprising the steps of:
providing a first clock at the positional element;
emitting a substantially continuously modulated acoustic waveform at said position of said positional element, said waveform synchronized with said first clock and decodable to fix said position,
emitting a synchronization signal at said position of said positional element, said synchronization signal being a sequence of at least two synchronization sub-signals, each synchronization sub-signal bearing timing data for said continuously modulated acoustic waveform, said synchronization signal being transmitted within a time frame having a fixed duration and being continuously repeated, said time frame being known to said positioning device, said timing data synchronized with said first clock;
providing a second clock at said positioning device;
receiving said acoustic waveform by said positioning device, via an arrangement of at least one of a first detector operative to detect said continuously modulated acoustic waveform in a manner permitting fixing of said position and outputting said waveform for computation, in a manner retentive of said position fixing ability;
receiving said synchronization signal by said positioning device,
deriving clock synchronization data from said synchronization signal by correlating said timing data and said time frame being known to said positioning device;
synchronizing said second clock with said first clock by said positioning device according to said clock synchronization data; and
computing said position of said positional device using said timing data and acoustic waveform.

34. A position detection method according to claim 33 wherein said acoustic waveform is an ultrasonic waveform.

35. A position detection method according to claim 33 wherein said synchronization signal is an electromagnetic signal.

36. A position detection method according to claim 33 wherein said synchronization signal is an infrared signal.

37. A position detection method according to claim 33 wherein said synchronization signal is a radio signal.

38. A position detection method according to claim 33 wherein said timing data comprises a measure of time elapsed between an identifiable component of said acoustic waveform and time of transmission of said synchronization signal.

39. A position detection method according to claim 38 wherein:
said positional element additionally comprises a first clock;
said positioning device additionally comprises a second clock; and
said synchronization signal comprises a clock synchronization data useful to synchronize between said first clock and said second clock.

40. A position detection method according to claim 33 wherein said synchronization signal additionally comprises identification data of said positional element.

41. A position detection method according to claim 33 wherein said emitting of said synchronization signal comprises:
providing a time-frame;
providing a fixed number of time slots within each said time-frame;
randomly selecting one of said time slots within each said time-frame; and
emitting said synchronization signal within said selected time slot.

42. A position detection method according to claim 41 wherein said synchronization signal additionally comprises identification data of said time-frame and identification data of said time slot within said time-frame bearing said synchronization signal.

43. A position detection method according to claim 42 wherein said time-frame identification data is a counter of said time-frames and said time slot identification data is a location numeral of said time slot within said time-frame bearing said synchronization signal.

44. A position detection method according to claim 42 and additionally comprising:
providing said time-frame duration to said positioning device in advance;
deriving data of said clock synchronization by said positioning device by correlating said received time-frame duration and a known time-frame duration.

45. A position detection method according to claim 44 wherein said step of deriving said clock synchronization data is performed by linearly interpolating a sequence of received time-frame durations and said known time-frame duration.

46. A position detection method according to claim 4 wherein said step of deriving clock synchronization data is performed by using a phase lock loop between a sequence of received time-frame durations and said known time-frame duration.

47. A position detection method according to claim 33 wherein said step of emitting said acoustic waveform additionally comprises randomly selecting said acoustic waveform from a predefined set of acoustic waveforms; and wherein said step of emitting a synchronization signal additionally comprises emitting identification data of said selected acoustic waveform.

48. A position detection method according to claim 47 wherein said acoustic waveform is a continuously modulated acoustic waveform.

49. A position detection method according to claim 48 wherein said modulation is a frequency modulation.

50. A position detection method according to claim 48 wherein said modulation is a phase modulation.

51. A position detection method according to claim 33 wherein said synchronization signal comprises an error correction code.

52. A position detection method according to claim 51 wherein said error correction code comprises at least one cyclic redundancy character.

53. A position detection method according to claim 33 wherein said step of emitting said synchronization signal additionally comprises emitting identification data of a change of a status of at least one discrete input.

54. A position detection method according to claim 53 wherein said discrete input is a state of a switch.

55. A position detection method according to claim 53 wherein said step of emitting said synchronization signal additionally comprises emitting a measure of time elapsed between said change of status of said discrete input and a transmission of said synchronization signal.

56. A position detection method according to claim 55 wherein said measure of elapsed time comprises a count of a number of said synchronization signals transmitted between said change of status of said discrete input and said transmission of said synchronization signal.

57. A position detection method according to claim 56 wherein said count of said synchronization signals is limited and when said limit is reached said count remains at said limit until a next occurrence of a change of status of a switch.

58. A position detection method according to claim 33 wherein said step of emitting said synchronization signal additionally comprises emitting at least one measurement data of at least one of an analog input and a digital input.

59. A position detection method according to claim 33 wherein said step of receiving said acoustic waveform at said first detector arrangement comprises receiving said acoustic waveform at least three first detectors.

60. A position detection method according to claim 33 wherein said step of receiving said acoustic waveform at said first detector arrangement comprises receiving said acoustic waveform via at least two first detectors and wherein said step of computing said position of said positional device comprises fixing said position in two dimensions.

61. A position detection method according to claim 33 wherein said step of receiving said acoustic waveform at said first detector arrangement comprises receiving said acoustic waveform via at least three first detectors and wherein said step of computing said position of said positional device comprises fixing said position in three dimensions.

62. A position detection method according to claim 33 wherein said positional element comprises a plurality of positional sub-elements.

63. A position detection method according to claim 39 wherein said step of emitting a sequence of synchronization signals starts at a predefined delay after emitting said identifiable component of said acoustic waveform, wherein said predefined delay is known to said positioning device, and wherein said step of synchronizing said second clock with said first clock uses said predefined delay to synchronize said second clock and said first clock.

64. A position detection system for use in association with computing applications, the system comprising: a positional element for attaining a position and comprising a first emitter and a second emitter each for emitting a continuously modulated acoustic waveform decodable to fix said position, the emitters being a predetermined distance apart, said two emitters sending orthogonal codes; and a detector arrangement for detecting said waveforms in a manner permitting fixing of said position and permitting determination of an attitude of said positional element, the detector arrangement further being operable to output said waveforms for computation, in a manner retentive of said position fixing ability;

said positional element further comprising a third emitter for emitting a synchronization signal;

said detector arrangement further comprising an additional detector operative to detect said synchronization signal, said synchronization signal, being transmitted within a time frame having a fixed duration and being continuously repeated, said time frame being known to said positioning device;

said synchronization signal being a sequence of at least two synchronization sub-signals, each synchronization sub-signal bearing timing data for said continuously modulated acoustic waveform and respective pressure data; and said detector arrangement being operative to estimate a virtual straight line connecting said first emitter, said second emitter and a virtual point on a screen associated with said computing application wherein said at least two synchronization sub-signals allow said positioning device to derive clock synchronization data by correlating said timing data and said known time frame duration.

* * * * *